United States Patent
Grampurohit et al.

(10) Patent No.: US 11,138,241 B2
(45) Date of Patent: Oct. 5, 2021

(54) METRIC DEFINITION AND VISUALIZATION

(71) Applicant: Walmart Apollo, LLC, Bentonville, AR (US)

(72) Inventors: Santosh Grampurohit, Karnataka (IN); Rahul Rout, Karnataka (IN); Achalla Ravi Kiran, Karnataka (IN); Sohan Lal Goyal, Karnataka (IN); Mayur Goradia, Maharashtra (IN); Sandeep George Moolayil, Kerala (IN); Kumaresan Muthukumarasamy, Karnataka (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/558,382

(22) Filed: Sep. 3, 2019

(65) Prior Publication Data

US 2021/0019338 A1   Jan. 21, 2021

(30) Foreign Application Priority Data

Jul. 19, 2019   (IN) .............................. 201941029191

(51) Int. Cl.
| | |
|---|---|
| *G06F 16/28* | (2019.01) |
| *G06F 16/901* | (2019.01) |
| *G06Q 10/06* | (2012.01) |
| *G06F 3/0486* | (2013.01) |

(52) U.S. Cl.
CPC .......... *G06F 16/287* (2019.01); *G06F 3/0486* (2013.01); *G06F 16/9024* (2019.01); *G06Q 10/06393* (2013.01)

(58) Field of Classification Search
CPC .......... G06Q 10/0639; G06Q 10/06393; G06F 16/9024; G06F 16/904; G06F 16/287; G06F 3/0486
See application file for complete search history.

(56) References Cited

U.S. PATENT DOCUMENTS

| | | | |
|---|---|---|---|
| 8,341,592 B2 | 12/2012 | Akkiraju et al. | |
| 8,468,177 B2 | 6/2013 | Reeves et al. | |
| 9,294,361 B1 | 3/2016 | Choudhary et al. | |
| 9,392,026 B2 | 7/2016 | Tien et al. | |
| 2004/0098358 A1* | 5/2004 | Roediger | G06N 5/00 706/46 |

(Continued)

FOREIGN PATENT DOCUMENTS

CN   102592203 A   6/2012

*Primary Examiner* — Sang H Kim

(57) ABSTRACT

Examples provide a metric definition component for creating and defining key performance indicators. A metric definition component connects to a set of data sources using database credentials to onboard the data tables. An extraction component automatically extracts data structures associated with the set of data sources. An analysis component analyzes the extracted set of data structures and a set of predefined performance metrics using a set of algorithms. The set of algorithms can include an entity classification algorithm, an entity search algorithm and/or an entity relational mapping algorithm. The metric definition component defines a set of KPIs based on the analysis of the extracted data. A visualization component generates a set of visualizations representing the set of KPIs.

20 Claims, 22 Drawing Sheets

(56) References Cited

U.S. PATENT DOCUMENTS

| | | |
|---|---|---|
| 2007/0174228 A1 | 7/2007 | Folting et al. |
| 2007/0294208 A1* | 12/2007 | Chowdhary .......... G06F 16/283 |
| 2009/0064025 A1* | 3/2009 | Christ .................. G06Q 10/087 |
| | | 715/772 |
| 2009/0106640 A1* | 4/2009 | Handy .................. G06Q 10/00 |
| | | 715/212 |
| 2010/0070893 A1* | 3/2010 | Schreck ................ G06F 3/0481 |
| | | 715/764 |
| 2016/0147380 A1* | 5/2016 | Coates ................. G06F 3/0482 |
| | | 715/736 |
| 2017/0132300 A1* | 5/2017 | Sekar ...................... G06F 16/26 |
| 2017/0329466 A1 | 11/2017 | Krenkler et al. |
| 2017/0351689 A1* | 12/2017 | Vasudevan ......... G06Q 10/0637 |
| 2018/0005159 A1* | 1/2018 | Antonini .......... G06Q 10/06393 |
| 2018/0247248 A1 | 8/2018 | Wei et al. |
| 2019/0102071 A1* | 4/2019 | Redkina ............... G06Q 10/067 |
| 2020/0019822 A1* | 1/2020 | Kothandaraman .. G06K 9/6253 |

\* cited by examiner

1400

2000

2100

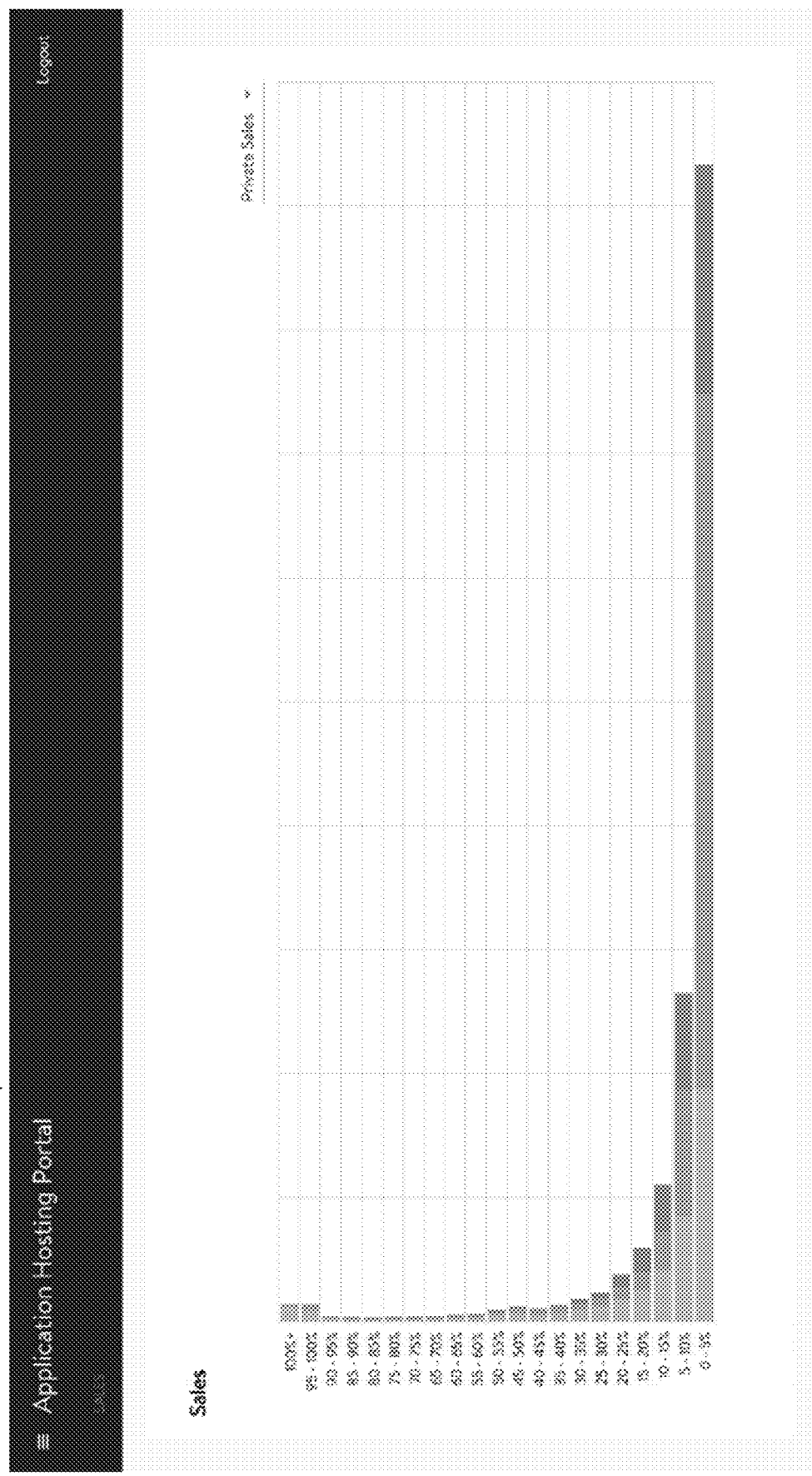

METRIC DEFINITION AND VISUALIZATION

BACKGROUND

To create new performance metrics for quantifying performance of various aspects of a business or enterprise, an analyst typically relies upon a development team to develop new key performance indicators (KPIs). The user typically identifies and documents the KPIs identified. The development team performs data sourcing, starts data tables identification and imports data. The user and development team synchronize to identify any gaps or changes during development process. When KPIs are crated, the user documents visualization requirements to enable the development team to start working on visualization of the KPIs. The development team develops and publishes graphical representations of the developed KPIs. This is a labor intensive, inefficient and time-consuming process for the user and the development team.

SUMMARY

Some examples provide a system for defining and visualizing key performance metrics. The system includes at least one processor communicatively coupled to a memory. A data storage device includes a set of data sources. A user interface is provided for receiving database credentials associated with connecting to the set of data sources. An onboarding component connects to the set of data sources using the connection data. An extraction component extracts data and corresponding data structure of data assets associated with the set of data sources and a set of predefined performance metrics. A metric definition component automatically defines at least one key performance indicator (KPI) based on analysis of the extracted data and a set of user-provided attribute operators for KPI creation. An export component exports at least one KPI to a destination data source. A visualization component creates a set of visualizations representing data associated with at least one KPI. An output device outputs at least one visualization in the set of visualizations to at least one user, wherein the at least one visual representation provides a graphical representation of a quantifiable measurement gauging performance based on the at least one KPI.

Other examples provide a computer-implemented method for defining and visualizing key performance metrics. An extraction component extracts data structures associated with a set of data sources. An analysis component analyzes extracted data structures and a set of predefined performance metrics. A metric definition component defines a set of KPIs based on the analysis of the extracted data. A visualization component generates at last one visualization representing data associated with the at least one KPI in the set of KPIs for display to a user via an output device.

Still other examples provide a computer storage device having computer-executable instructions for defining and visualizing key performance metrics by a metric definition component. The metric definition component uploads a dynamic set of data sources. The dynamic set of data sources are uploaded to a database for analysis during creation of the set of KPIs. A set of data structures associated with the uploaded set of data sources are extracted. The metric definition component analyzes the extracted set of data structures and a set of predefined performance metrics are analyzed. The metric definition component defines a set of KPIs based on the analysis of the extracted data. The metric definition component exports the set of KPIs and data associated with the set of KPIs to at least one destination database associated with at least one data storage device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 22 is an exemplary screenshot illustrating a KPI visualization.

Corresponding reference characters indicate corresponding parts throughout the drawings.

DETAILED DESCRIPTION

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Referring to the figures, examples of the disclosure enable a metric definition tool that defines and discovers key performance indicators (KPIs) for users that do not have extensive knowledge or experience with structured query language (SQL) or database queries. In some examples, the system provides user-friendly intuitive screens for creating new KPIs. The user interface reduces user-time required to develop new KPIs and improves user efficiency via the user interface.

In other examples, the system provides a user-friendly tool which enables users to create and experiment with new KPIs themselves despite limited technical knowledge. The user can collaborate with others by sharing/exporting the new KPIs to other users/databases and/or applications via export and output of KPIs enabled by other examples of the metric definition tool.

Figure 1:
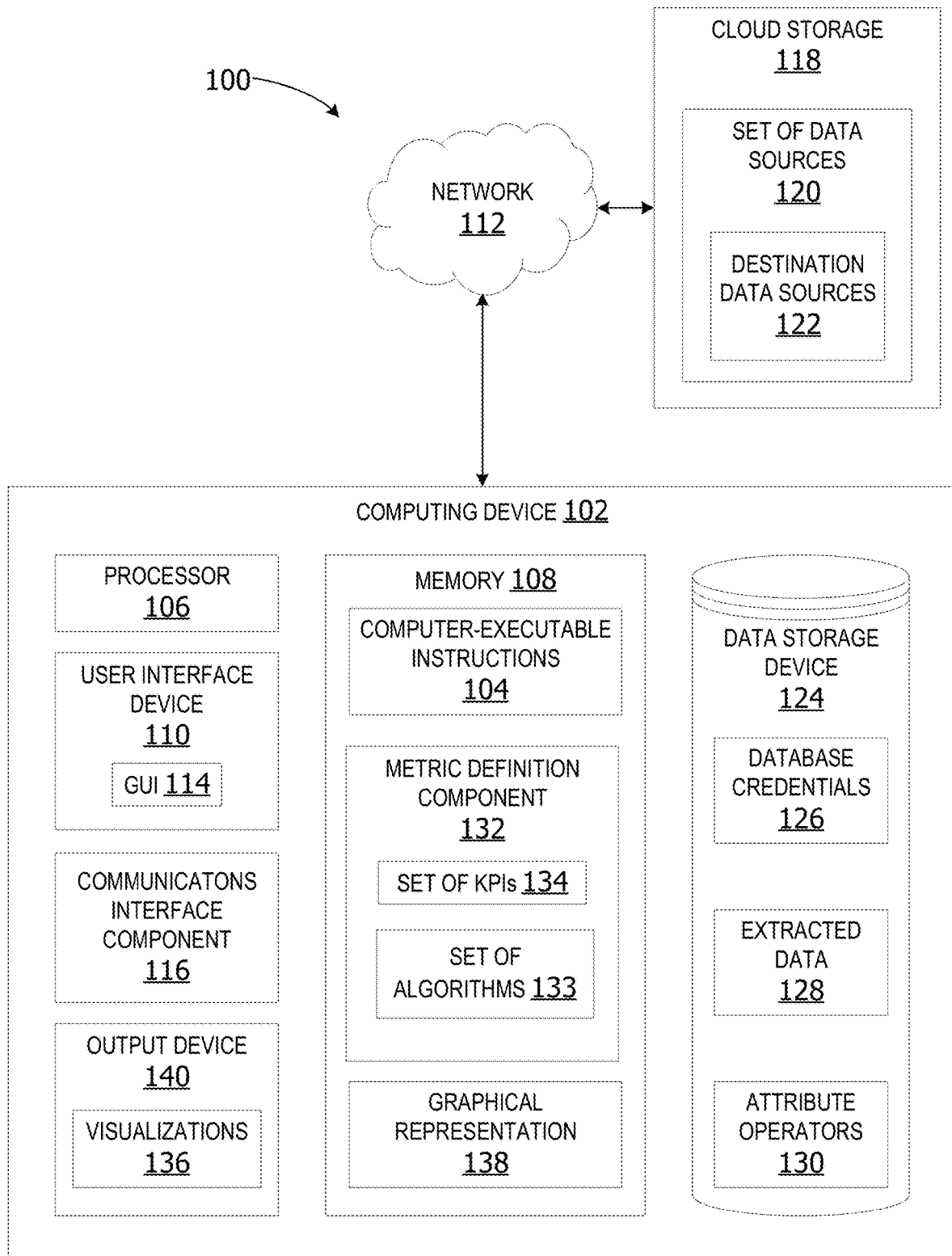
FIG. 1 is an exemplary block diagram illustrating a system for metric definition and visualization.

Referring again to FIG. 1, an exemplary block diagram illustrates a system 100 for metric definition and visualization. In the example of FIG. 1, the computing device 102 represents any device executing computer-executable instructions 104 (e.g., as application programs, operating system functionality, or both) to implement the operations and functionality associated with the computing device 102. The computing device 102 in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 in other examples includes a user interface device 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 6, FIG. 7, FIG. 8, FIG. 9, FIG. 10, FIG. 11 and FIG. 12).

The computing device 102 further has one or more computer-readable media, such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

In some examples, the user interface device 110 generates a graphical user interface (GUI) 114. The GUI 114 provides a user-friendly interface between the user and the metric definition tool.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface device 116. The communications interface device 116 includes a network interface card and/or computer-executable instructions (e.g., a driver) for operating the network interface card. Communication between the computing device 102 and other devices, such as but not limited to a cloud storage 118, can occur using any protocol or mechanism over any wired or wireless connection. In some examples, the communications interface device 116 is operable with short range communication technologies such as by using near-field communication (NFC) tags.

The cloud storage 118 is a logical data store providing data storage services to the computing device 102 or other clients. The cloud storage 118 is hosted and/or delivered via the network 112. In some non-limiting examples, the cloud storage 118 is associated with one or more physical data storage devices in one or more data centers. In other examples, the cloud storage 118 is associated with a distributed network of data storage devices.

In this non-limiting example, the cloud storage 118 includes a set of data sources 120. The set of data sources 120 includes one or more data stores, such as, but not limited to, a database. The set of data sources 120 can include a source of data for extraction and/or analysis. The set of data sources 120 can also include a destination data source 122. A destination data source 122 is a destination for exporting/storing new or pre-existing KPIs.

The system 100 can optionally include a local data storage device 124 for storing data, such as, but not limited to database credentials 126, extracted data 128 and/or attribute operators 130. Database credentials 126 includes data providing credentials enabling the computing device 102 to connect to one or more data sources in the set of data sources 120. The extracted data 128 is data extracted/obtained from the set of data sources 120. The attribute operators 130 includes one or more attributes as operators.

The data storage device 124 can include one or more different types of data storage devices, such as, for example, one or more rotating disks drives, one or more solid state drives (SSDs), and/or any other type of data storage device. The data storage device 124 in some non-limiting examples includes a redundant array of independent disks (RAID) array. In other examples, the data storage device 124 includes a database, such as, but not limited to, the database 500 in FIG. 5 below.

The data storage device 124 in this example is included within the computing device 102, attached to the computing device, plugged into the computing device or otherwise associated with the computing device 102. In other examples, the data storage device 124 includes a remote data storage accessed by the computing device via the network 112, such as a remote data storage device, a data storage in a remote data center, or a cloud storage.

The memory 108 in some examples stores one or more computer-executable components. Exemplary components include a metric definition component 132. The metric definition component can also be referred to as a metric definition tool.

The metric definition component 132 in some examples connects to the cloud storage 118 or other data source using the database credentials 126. Once the connection is established, the metric definition component 132 extracts data, such as, but not limited to, a set of data structures associated with the set of data sources 120. The metric definition component 132 analyzes the extracted data 128 using a set of algorithms 133 to define a set of KPIs 134.

The set of algorithms 133 can include, without limitation, an entity classification algorithm, an entity search algorithm and/or an entity relational mapping algorithm. The metric definition component 132 generates a set of one or more visualizations 136 of one or more of the KPIs. A visualization is a graphical representation 138 of a KPI.

The metric definition component 132 can export the KPIs and/or visualizations 136 to another application and/or database. In other examples, the metric definition component 132 displays the one or more KPIs and/or the visualizations 136 via the user interface device 110. In still other examples, the metric definition component 132 outputs the set of KPIs 134 and/or the visualizations 136 via an output device 140. The output device 140 can be implemented as a display device, a printer, a speaker system, a projector, an augmented reality device, a user device, or any other type of output device.

The metric definition component provides an application and UI which helps a user explore, define and discover KPIs without technical knowledge of visualization, SQL and database. The metric definition component permits the user to define metrics within the application without the need for developer intervention. In some examples, the user identifies the KPIs required without documentation for the KPIs. The metric definition component applies an interface for creating the KPI. The metric definition component develops the SQL query for the formula entered and auto identifies the rollup columns required for the query.

In other examples, the metric definition component provides end-to-end solution for development and publishing of KPIs. The metric definition component allows a user or business to visualize KPIs in any form, such as graphs, charts, tables, grids or any other form. A chart can include a bar chart, line chart, pie chart, etc. the metric definition component further reduces the time required to create and visualize PKIs. In some examples, the metric definition component provides an eighty percent improvement in creation and visualization time.

Figure 2:
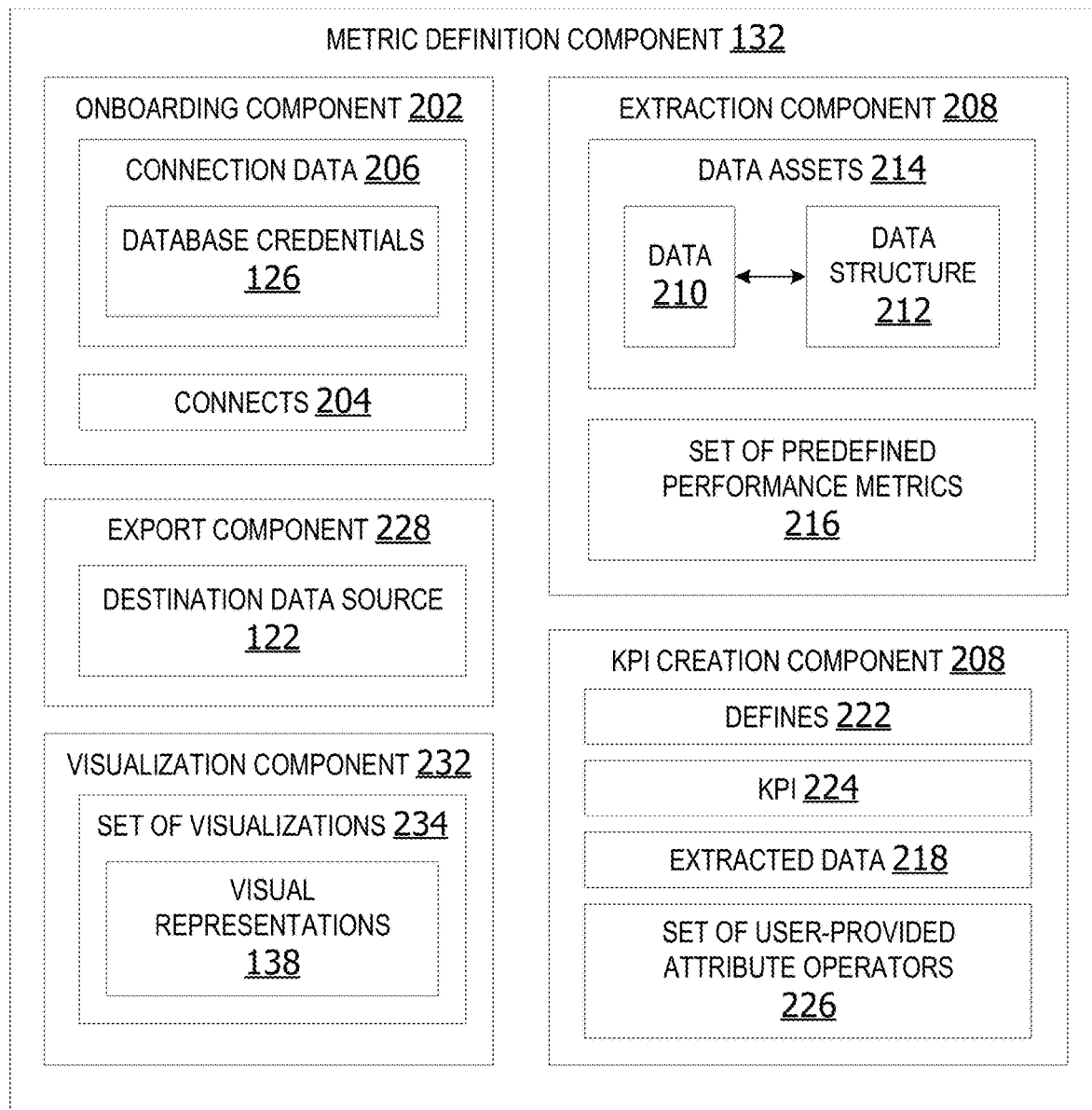
FIG. 2 is an exemplary block diagram illustrating a metric definition component for generating KPIs and visualizations of KPIs.

FIG. 2 is an exemplary block diagram illustrating a metric definition component 132 for generating KPIs and visualizations of KPIs. In some examples, the metric definition component 132 includes an onboarding component 202. The onboarding component 202 connects 204 to a set of data sources using connection data 206. The connection data 206 can be received from a user via a user interface device or received via a network. The connection data 206 in some examples includes the database credentials 126 used to initiate a connection with one or more data sources.

An extraction component 208 in other examples extracts data 210 and corresponding data structure 212 of data assets 214 associated with the set of data sources. The extraction component 208 can also optionally extract/retrieve a set of predefined business performance metrics 216, such as, but not limited to, previously created KPIs. The extracted data 218 includes the data structure(s) 212 and/or the predefined performance metrics.

In some examples, a KPI creation component 220 automatically defines 222 at least one key performance indicator (KPI) 224 based on analysis of the extracted data 218 and a set of user-provided attribute operators 226 to create one or more KPIs corresponding to attributes or key words provided by the user.

An export component 228 exports at least one newly created KPI to a destination data source, such as, but not limited to, the destination data source 122. The destination data source 122 can include a database, a cloud storage, an application, or other destination.

A visualization component 232 in other examples creates a set of visualizations 234 representing data associated with at least one newly created KPI. A visualization in the set of visualizations 234 includes a graphical representation 138 of a KPI.

Figure 3:
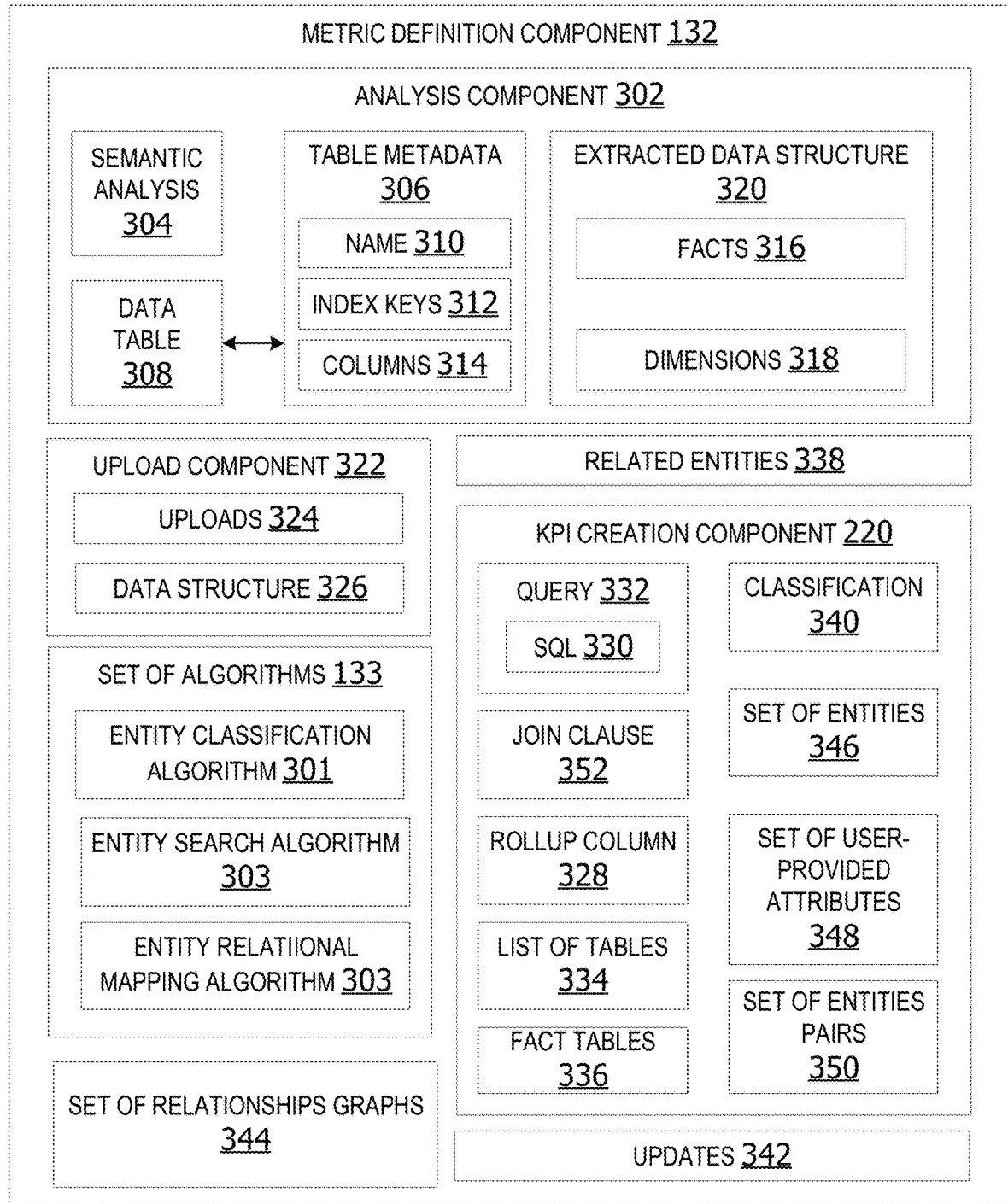
FIG. 3 is an exemplary block diagram illustrating a metric definition component for KPI creation.

FIG. 3 is an exemplary block diagram illustrating a metric definition component 132 for KPI creation. In some examples, an analysis component 302 performs semantic analysis 304 on table metadata associated with a set of data tables available via the connected set of data sources, such as the data table 308. The extracted table metadata identifies at least one of table name 310, index keys 312 and/or columns 314.

In some non-limiting examples, the metric definition component enables the user to add columns and mathematical functions and arithmetic operations for KPI creation. The functions can include aggregations, such as, average (AVG), count, maximum (MAX), minimum (MIN), etc.

In other examples, the analysis component 302 automatically identifies facts 316 and/or dimensions 318 within at least one data structure extracted from at least one data source in the set of data sources. The extracted data structure 320 is a data structure extracted from at least one data source during the onboarding process.

An upload component 322 in other examples uploads 324 a data structure 326 during onboarding. The data structures uploaded by the upload component can include the extracted data structure 320 utilized by the analysis component 302.

The metric definition component uses a set of algorithms 133 to create KPIs and/or KPI visualizations. The set of algorithms 133 can include, without limitation, an entity classification algorithm 301, an entity search algorithm 303 and/or an entity relational mapping algorithm 305.

In some examples, a KPI creation component 220 automatically identifies one or more rollup columns 328 associated with at least one data table 308 required for at least one structured query language (SQL) 330 query 332 associated with identifying at least one KPI. The KPI creation component 220 in other examples utilizes data obtained from a dynamic set of data sources, such as, but not limited to, a list of tables 334, dimensions 318 and/or fact tables 336. The dynamic set of data sources are uploaded to a database for analysis during creation of the set of KPIs by the upload component 322.

In some non-limiting examples, the metric definition component 132 onboards related entities 338. In these examples, the metric definition component classifies entities as facts 316 or dimensions 318. The metric definition component 132 updates 342 classification 340 with updates from a user on condition user-provided updates are provided. The metric definition component persists information from the updated classification into a set of relationship graphs 344.

In other examples, the metric definition component searches for related entities and attributes using a set of user-provided key words. The metric definition component identifies entities related to the set of user-provided key words from a relationship graph. The metric definition component adds the entities and attributes to a result set.

In still other examples, the metric definition component identifies a set of entities 346 associated with a set of user-provided attributes 348. The metric definition component obtains a set of entity pairs 350 from an entities list. The metric definition component creates a join clause 352 using a set of primary keys (PKs) for each pair from the entities list. The metric definition component creates a query using input provided by at least one user along with the created join clause 352.

In other examples, the system identifies the primary key (PK) of the tables and compares it with the available dimensions. This assists with identifying possible upgrades. The system checks if the PK of one table is a proper subset of another table. If PK of one table is not proper subset of another table then try upgrading the composite PK and then check. Based on PK subset, the system identifies the type of relation between the tables.

Figure 4:
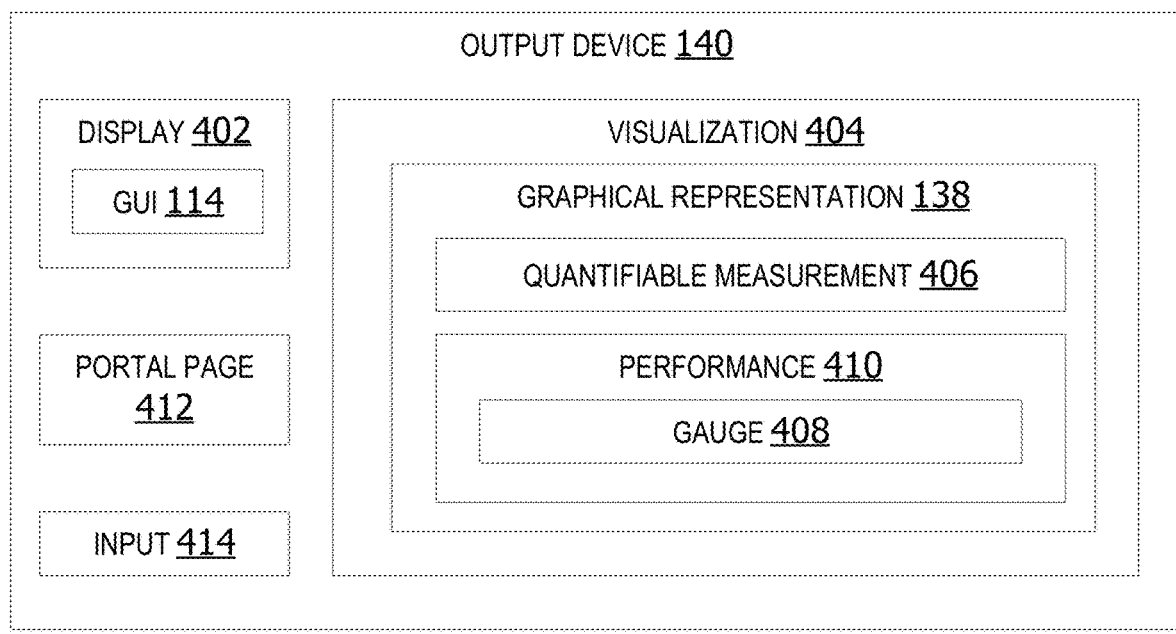
FIG. 4 is an exemplary block diagram illustrating an output device generating a graphical user interface (GUI) display.

FIG. 4 is an exemplary block diagram illustrating an output device 140 generating a GUI 114 display 402. The output device 140 can output a display of a visualization 404 in the set of visualizations to at least one user. The visualization 404 provides a graphical representation 138 of a quantifiable measurement 406 to gauge 408 performance 410 of an aspect of a business based on the at least one KPI (performance metric).

The GUI 114 in some examples provides a drag-and-drop option enabling a user to drag-and-drop entities and attributes required for visualizing the formula for a selected KPI. The GUI 114 in other examples provides an interface to visualize multiple formulas for creating a selected KPI.

A portal page 412 provided via an Internet connection in other examples provides a set of GUI options for self-service creation of KPIs via the metric definition component. The portal page 412 is accessed via a web browser in some non-limiting examples. A user interacting with the GUI 114 provides input 414 for connecting with a data source, initiating creation of new KPIs and/or initiating creation of a visualization of one or more KPIs.

Figure 5:
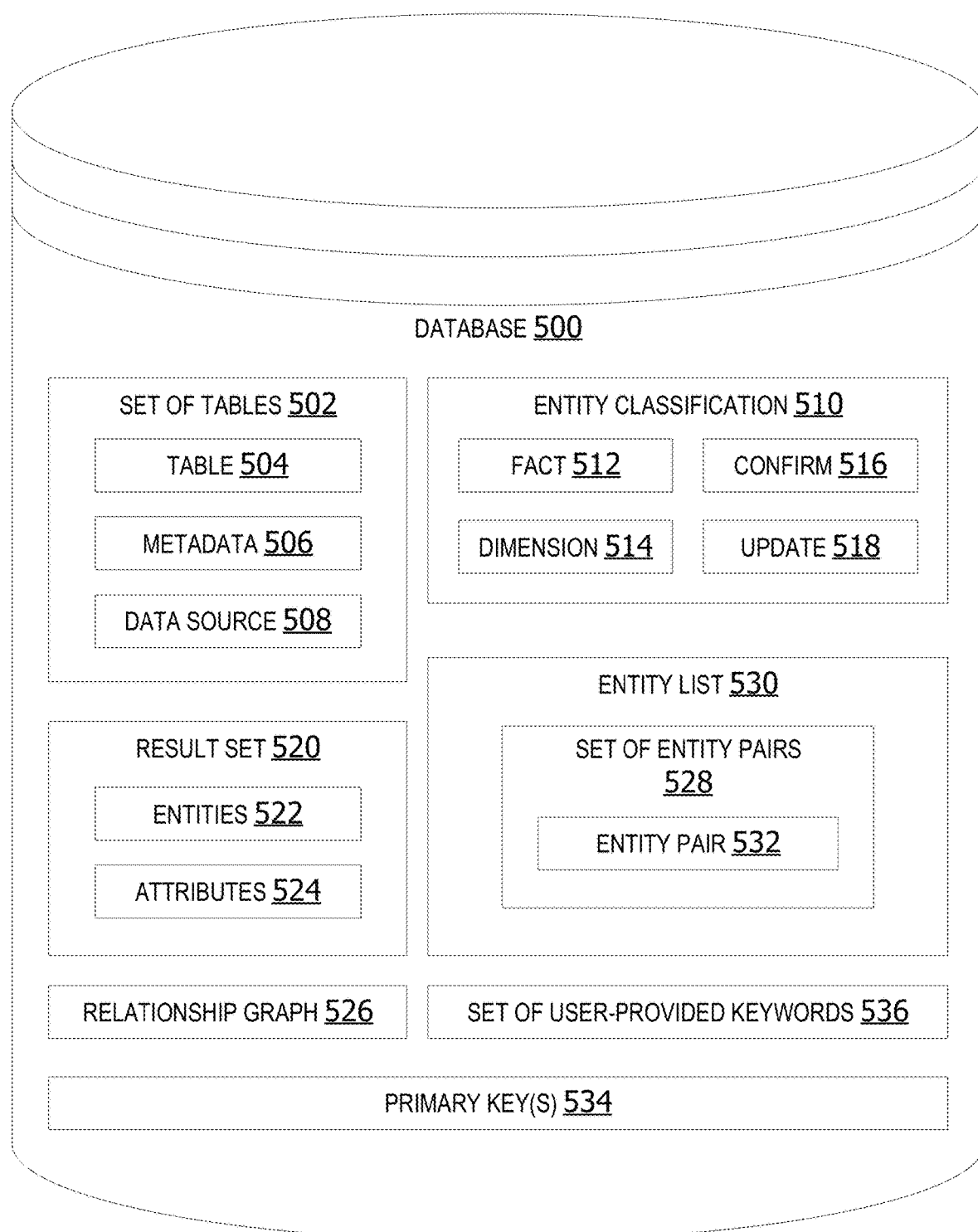
FIG. 5 is an exemplary block diagram illustrating a database for storing data associated with definition and visualization of KPIs.

FIG. 5 is an exemplary block diagram illustrating a database 500 for storing data associated with definition and visualization of KPIs. The database 500 can store a set of tables 502, including a table 504 and/or table metadata 506 extracted from one or more data sources, such as a data source 508. The set of tables within a database can be associated with one or more data sources in the set of data sources. The onboarding component imports the set of tables via the database credentials.

The database 500 in other examples include entity classification 510, including classification as fact 512 or dimension 514. The entity classifications are generated automatically by the metric definition component. However, a user can confirm 516 classifications or provide an update 518 of classifications.

A result set 520 includes entities 522 and attributes 524 identified by searching for related entities and attributes using a set of user-provided key words to identify entities related to the set of user-provided key words from a relationship graph 526.

The metric definition component in some examples obtains a set of entity pairs 528 from an entities list 530. The set of entity pairs 528 includes at least one entity pair 532. A join clause can be created using a set of primary keys 534 for each pair from the entity list 530.

Figure 6:
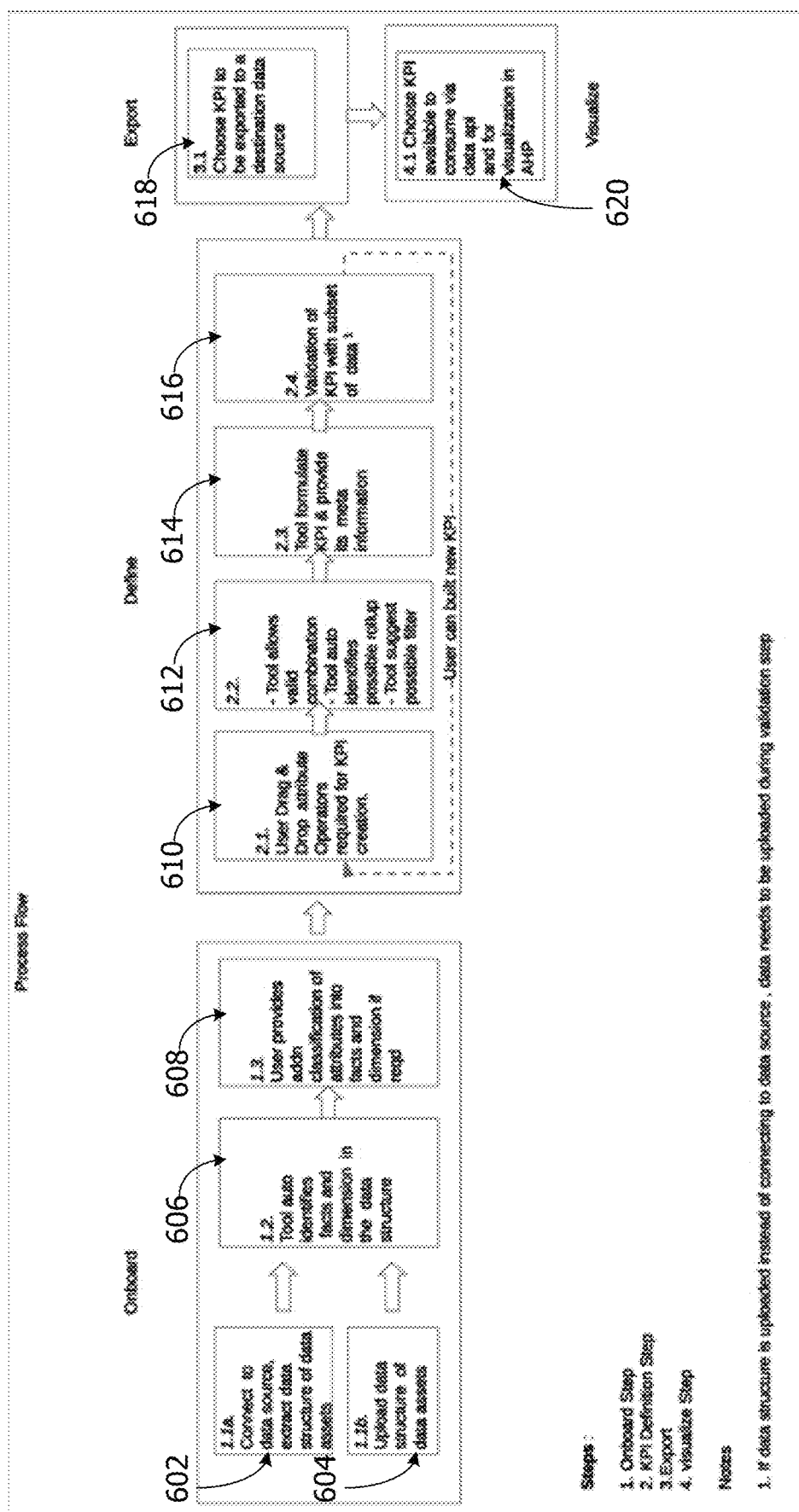
FIG. 6 is an exemplary block diagram illustrating a process for defining and visualization KPIs.

FIG. 6 is an exemplary block diagram illustrating a process 600 for defining and visualization KPIs. The process shown in FIG. 7 is performed by a metric definition component, executing on a computing device, such as the computing device 102.

The process begins by connecting to a data source and extracting data structure(s) at 602. The metric definition component uploads the data structure of data assets at 604. The metric definition component automatically identifies facts and dimensions in the data structure at 606. The user can provide additional classification of attributes into facts and dimension if required at 608. The user can utilize a drag and drop option associated with the GUI to drag and drop attribute operators required for KPI creation at 610. The metric definition component allows valid combination, auto identifies possible rollup and suggests possible search filters at 612. The metric definition component formulates a new KPI and provides its metadata at 614. Validation of the KPI with a subset of data is performed at 616.

The user chooses a KPI to be exported to a destination data source at 618. The user utilizes the user interface to choose a KPI available to consume via an application programming interface (API) and for visualization at 620. The process terminates thereafter.

Figure 7:
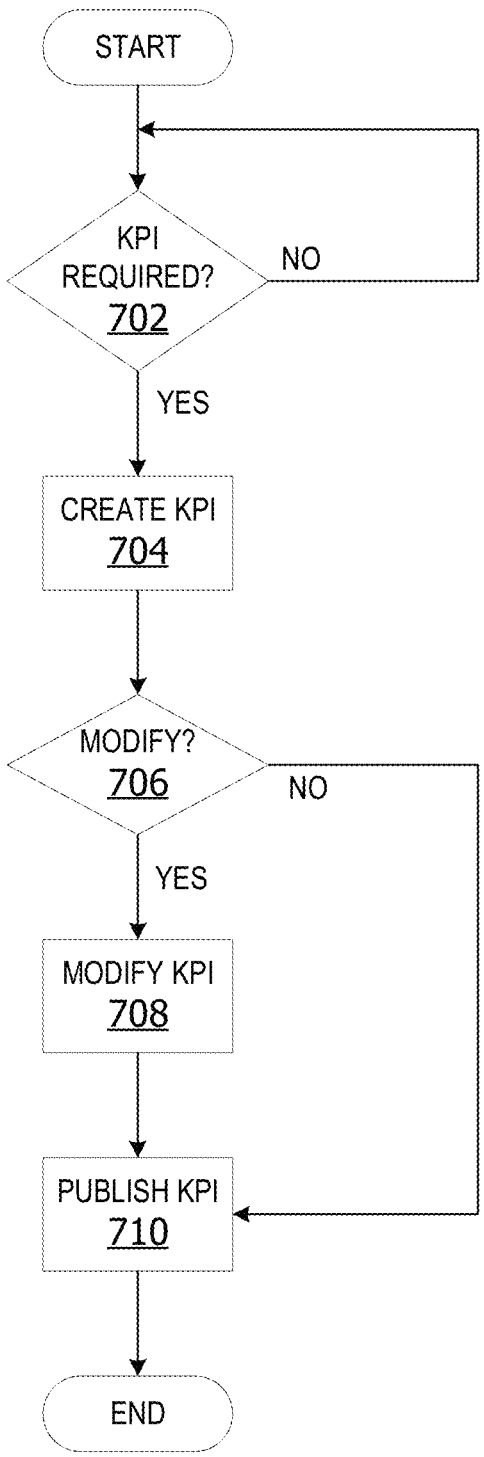
FIG. 7 is an exemplary flow chart illustrating operation of the computing device to create and publish a KPI.

FIG. 7 is an exemplary flow chart illustrating operation of the computing device to create and publish a KPI. The process shown in FIG. 7 is performed by a metric definition component, executing on a computing device, such as the computing device 102.

The process begins by determining whether a new KPI is required at 702. If yes, the metric definition component creates a KPI at 704. The metric definition component determines if the KPI should be modified at 706. If yes, the metric definition component modifies the KPI at 708. The metric definition component publishes the KPI at 710. The process terminates thereafter.

While the operations illustrated in FIG. 7 are performed by a computing device, aspects of the disclosure contemplate performance of the operations by other entities. In a non-limiting example, a cloud service performs one or more of the operations.

Figure 8:
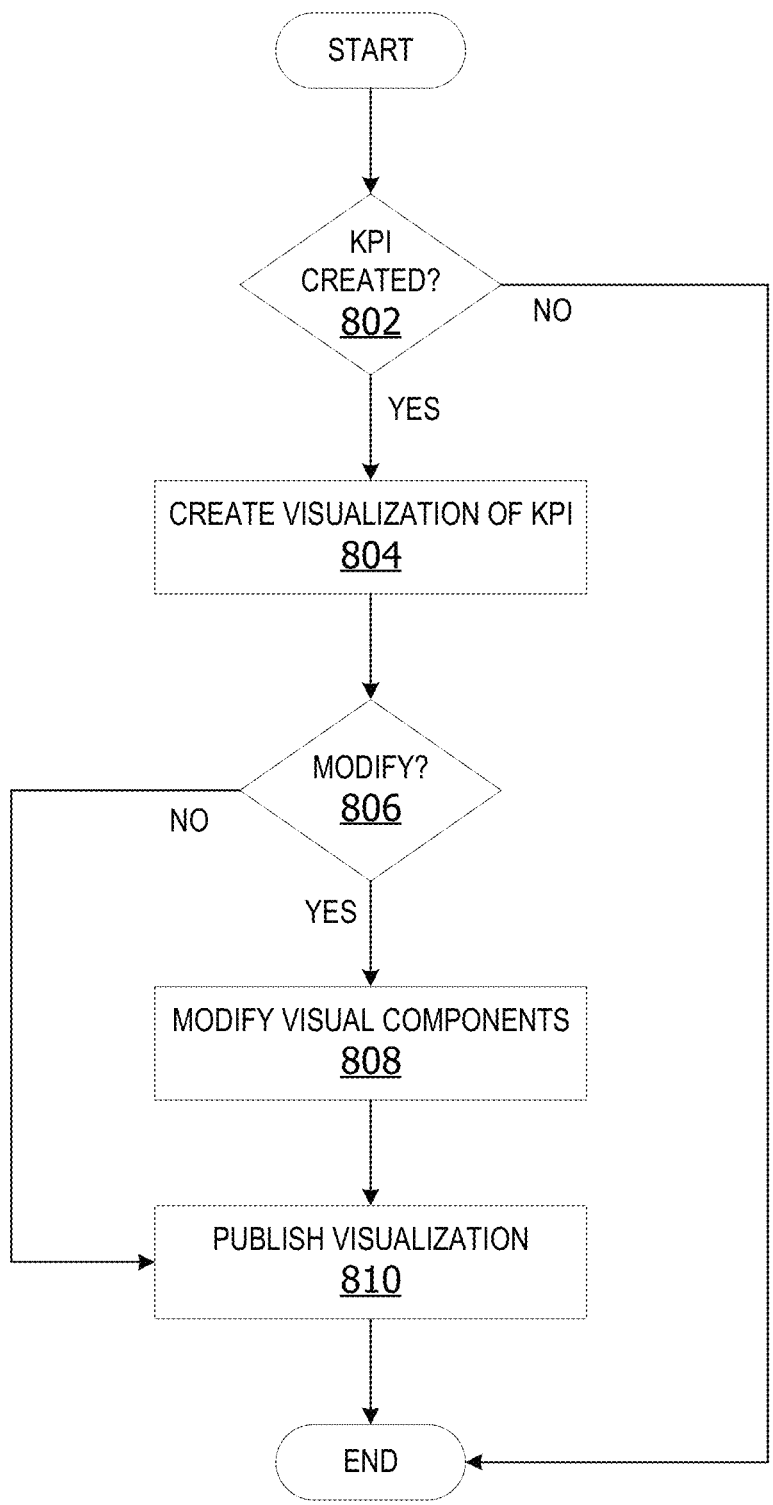
FIG. 8 is an exemplary flow chart illustrating operation of the computing device to create a visualization of a KPI.

FIG. 8 is an exemplary flow chart illustrating operation of the computing device to create a visualization of a KPI. The process shown in FIG. 8 is performed by a metric definition component, executing on a computing device, such as the computing device 102.

The process begins by determining whether a KPI is created at 802. If yes, the metric definition component creates a visualization of a KPI at 804. The metric definition component determines whether to modify the visualization at 806. If yes, the metric definition component modifies visual components of the visualization at 808. The metric definition component publishes the visualization at 810. The process terminates thereafter.

While the operations illustrated in FIG. 8 are performed by a computing device, aspects of the disclosure contemplate performance of the operations by other entities. In a non-limiting example, a cloud service performs one or more of the operations.

Figure 9:
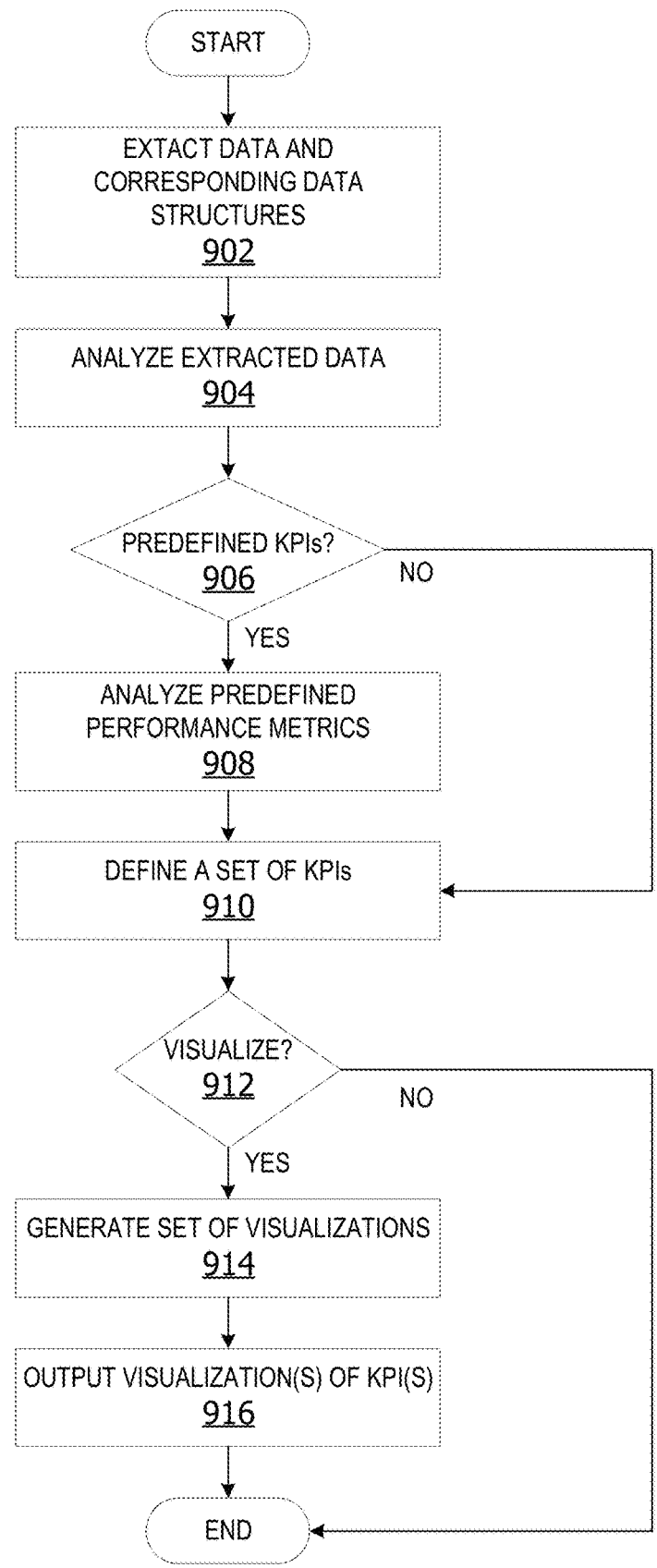
FIG. 9 is an exemplary flow chart illustrating operation of the computing device to define a set of KPIs and a set of KPI visualizations.

FIG. 9 is an exemplary flow chart illustrating operation of the computing device to define a set of KPIs and a set of KPI visualizations. The process shown in FIG. 9 is performed by a metric definition component, executing on a computing device, such as the computing device 102.

The process begins by extracting data and corresponding data structures at 902. The metric definition component analyzes the extracted data at 904. The metric definition component determines if there are any predefined KPIs at 906. If yes, the metric definition component analyzes the predefined performance metrics at 908. The metric definition component defines a set of KPIs at 910. The metric definition component determines whether to create a visualization at 912. If yes, the metric definition component generates a set of visualizations at 914. The metric definition component outputs visualization(s) of the KPI(s) at 916. The process terminates thereafter.

While the operations illustrated in FIG. 9 are performed by a computing device, aspects of the disclosure contemplate performance of the operations by other entities. In a non-limiting example, a cloud service performs one or more of the operations.

The metric definition component onboards related entities for the user in some examples. The metric definition component analyzes entities and classify the entities into fact or dimension entity. The relationship between the existing entities onboarded and new entities are calculated and updated to the relationship graph. The metric definition tool suggests the classification to the user. The user can edit and make changes to the classification if requested. After confirming with the user, the relationship is persisted.

Figure 10:
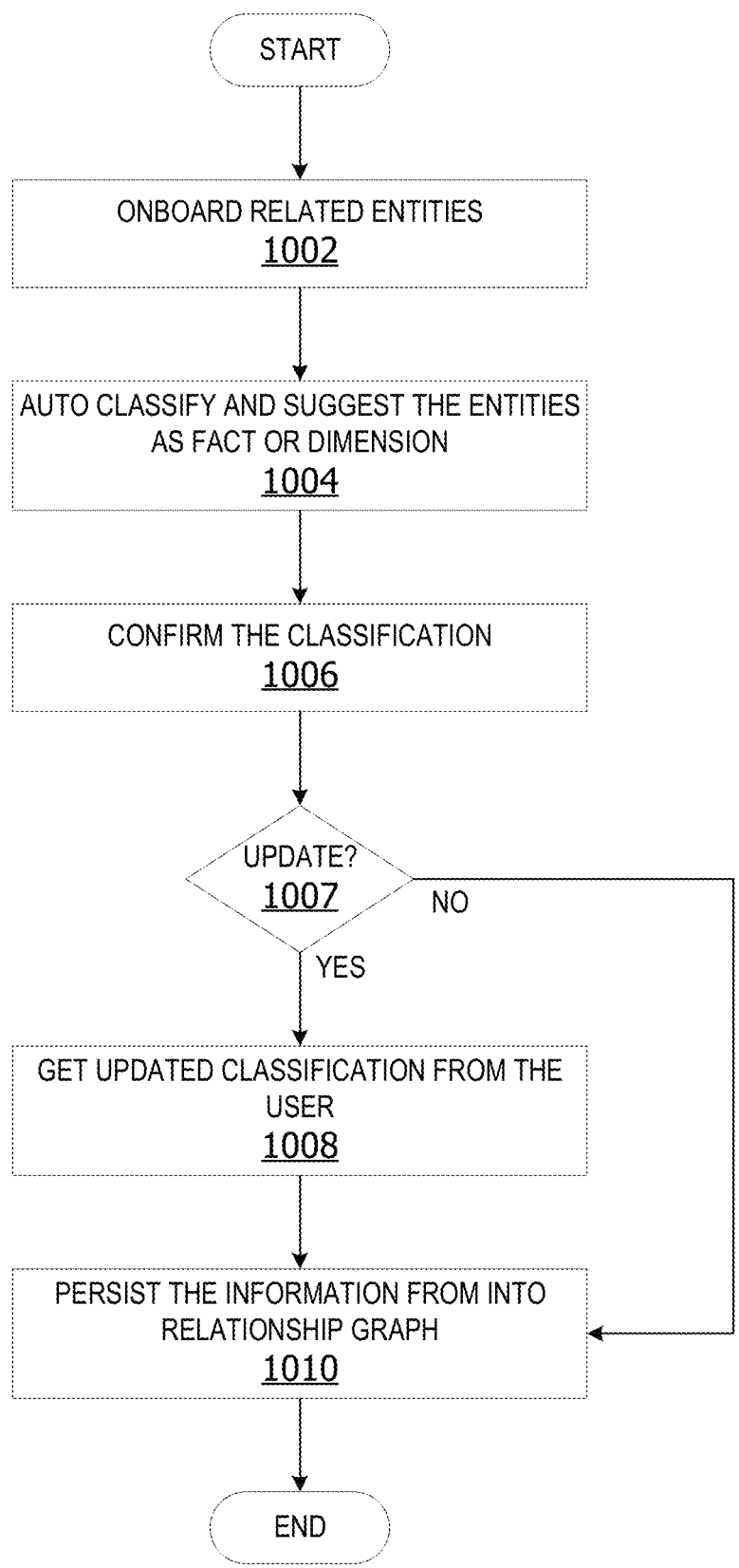
FIG. 10 is an exemplary flow chart illustrating operation of the computing device to perform entity classification.

FIG. 10 is an exemplary flow chart illustrating operation of the computing device to perform entity classification. The process shown in FIG. 10 is performed by a metric definition component, executing on a computing device, such as the computing device 102.

The process begins by onboarding related entities at 1002. The metric definition component auto-classifies and suggests the entities as fact or dimension at 1004. The metric definition component confirms the classification at 1006. Confirmation can be based on user-provided input. The metric definition component determines whether to update the classification at 1006. If yes, the metric definition component gets updated classification from the user at 1008. The metric definition component persists the information from the classification into a relationship graph at 1010. The process terminates thereafter.

While the operations illustrated in FIG. 10 are performed by a computing device, aspects of the disclosure contemplate performance of the operations by other entities. In a non-limiting example, a cloud service performs one or more of the operations.

In some examples, the metric definition component provides an interface that enables the user to search for entities and attributes in the create KPI step. The entity search algorithm is used to search the entities and attributes. The search provides results used to create the KPI. When the user enters a keyword, the metric definition component creates a list of results using a keyword search. Attributes and entities whose name match with the comma separated values (CSV) provided by user are added to the result set. Some entities may not be related to the search keyword alphabetically, but they are related from the relationship graph. The relationship graph is created at the onboarding step.

In some examples, a general SQL query generation requires deviation expressions and filter expressions in the same form as its SQL equivalent. The entity relational mapping algorithm creates the join clause using inputs from the user. When using the metric definition component to define a KPI, the user inputs attributes required from KPI and filter conditions to be applied. The attributes input used to create join clause. Filter conditions and the join clause are used by the metric definition component for query creation.

In other examples, the metric definition component groups all entities into pairs after identifying entities for a query. If entities are A, B and C, the entities pair can be AB, AC, BA, BC, CA and CB. Pairs are symmetric in nature. The metric definition component removes duplicates to identify unique entity pairs from entities list. In this example, the unique entities list includes AB, AC and BC. In still other examples, the metric definition component uses subset of primary keys to define the join clause for each entity pair.

Figure 11:
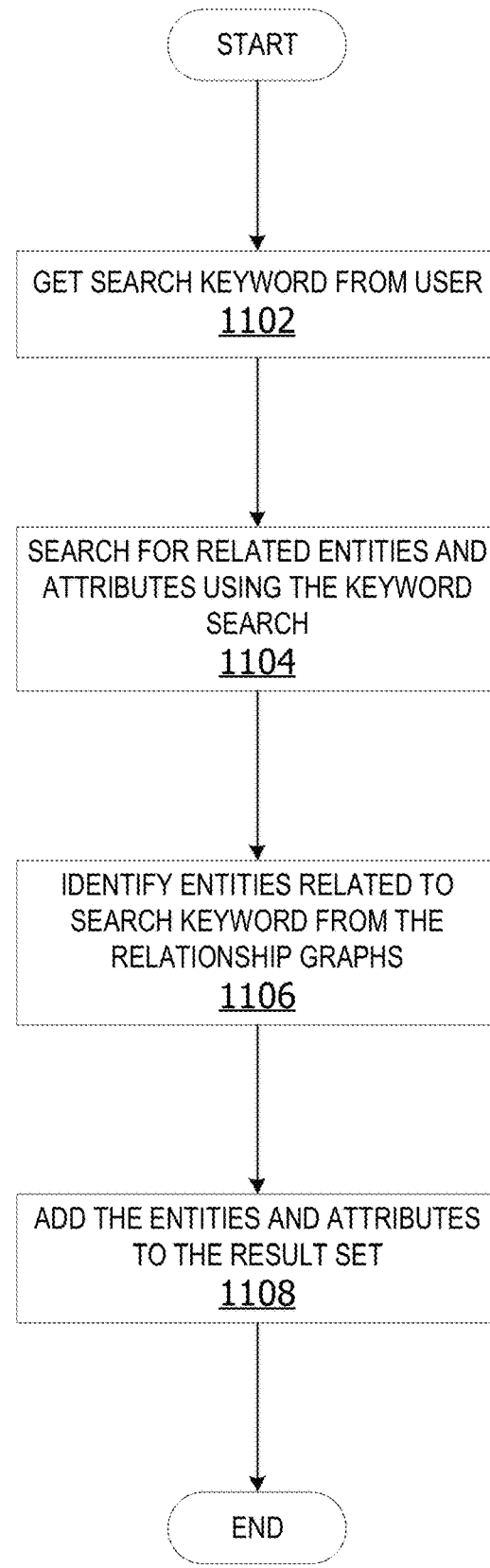
FIG. 11 is an exemplary flow chart illustrating operation of the computing device to perform entity search.

FIG. 11 is an exemplary flow chart illustrating operation of the computing device to perform entity search. The process shown in FIG. 11 is performed by a metric definition component, executing on a computing device, such as the computing device 102.

The process begins by getting a search keyword from a user at 1102. The metric definition component searches for related entities and attributes using the keyword search at 1104. The metric definition component identify entities related to search keyword from the relationship graphs at 1106. The metric definition component adds the entities and attributes to the result set at 1108. The process terminates thereafter.

While the operations illustrated in FIG. 11 are performed by a computing device, aspects of the disclosure contemplate performance of the operations by other entities. In a non-limiting example, a cloud service performs one or more of the operations.

The process gets attributes from a user at 1202. The metric definition component gets all entities for the attributes at 1204. The metric definition component gets unique entity pairs from the entities list at 1206. The metric definition component creates a join clause using PKs of entity for each pair from the list at 1208. The metric definition component creates query using the input provided by users and the join clause at 1210. The process terminates thereafter.

Figure 12:
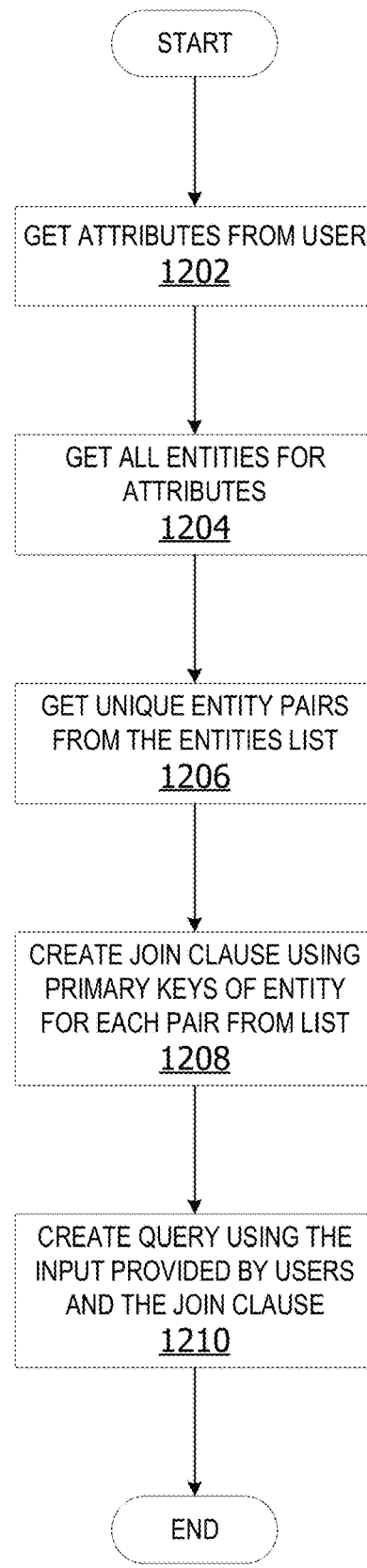
FIG. 12 is an exemplary flow chart illustrating operation of the computing device to perform relationship mapping.

FIG. 12 is an exemplary flow chart illustrating operation of the computing device to perform relationship mapping. The process shown in FIG. 12 is performed by a metric definition component, executing on a computing device, such as the computing device 102.

While the operations illustrated in FIG. 12 are performed by a computing device, aspects of the disclosure contemplate performance of the operations by other entities. In a non-limiting example, a cloud service performs one or more of the operations.

Figure 13:
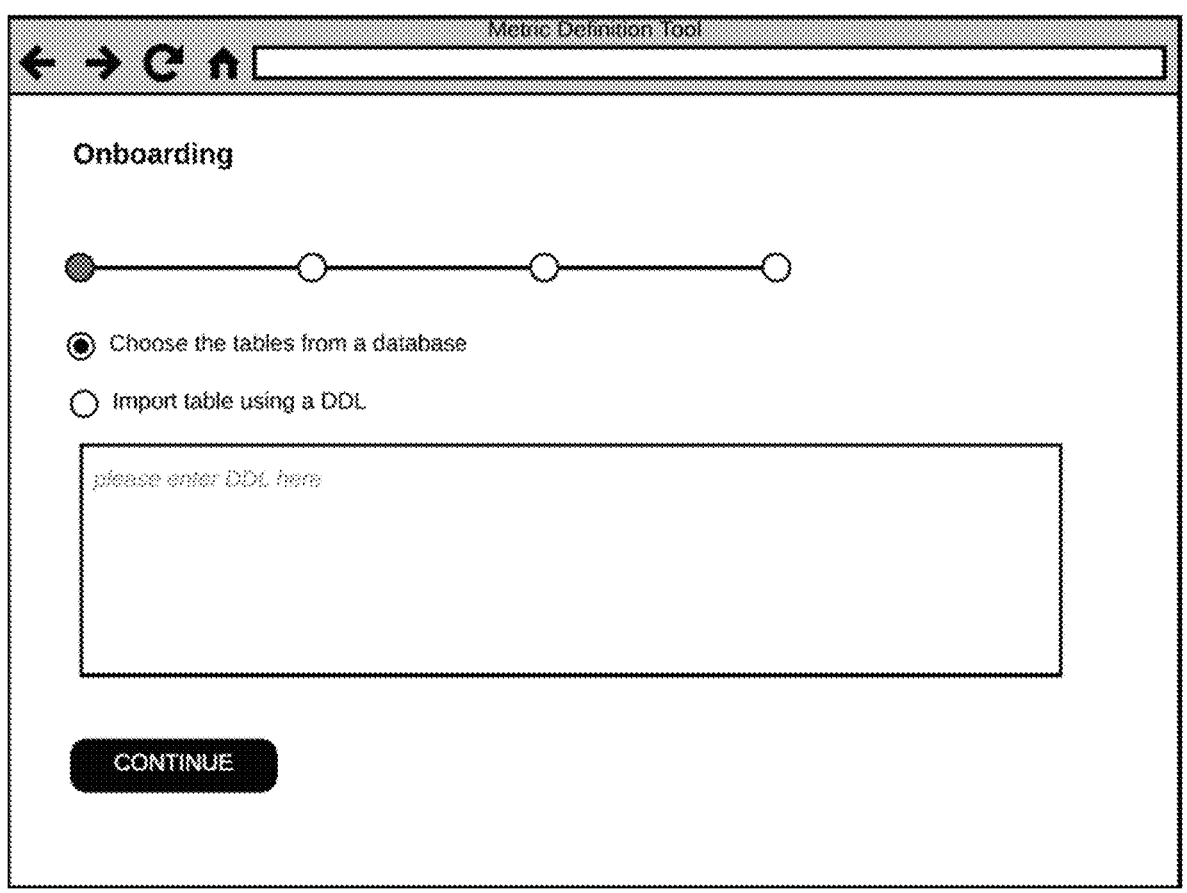
FIG. 13 is an exemplary screenshot illustrating a UI enabling user-selection of tables from a database for onboarding.

FIG. 13 is an exemplary screenshot 1300 illustrating a UI enabling user-selection of tables from a database for onboarding. A user selects an option to choose tables from a database for onboarding or importing a table using a data definition language (DDL).

Figure 14:
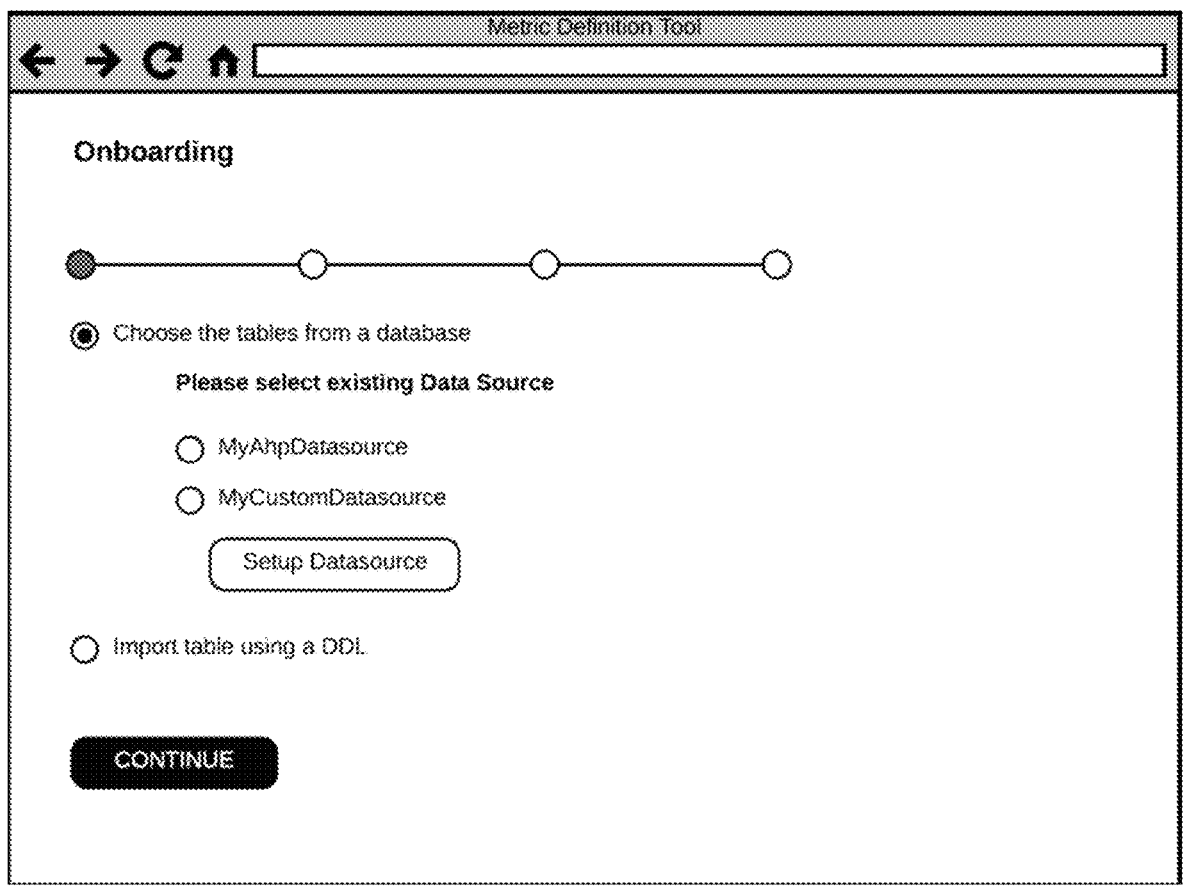
FIG. 14 is an exemplary screenshot illustrating a UI enabling user-selection of existing data source for onboarding.

FIG. 14 is an exemplary screenshot 1400 illustrating a UI enabling user-selection of existing data source for onboarding. A user can select an existing data source or a custom data source in this non-limiting example.

Figure 15:
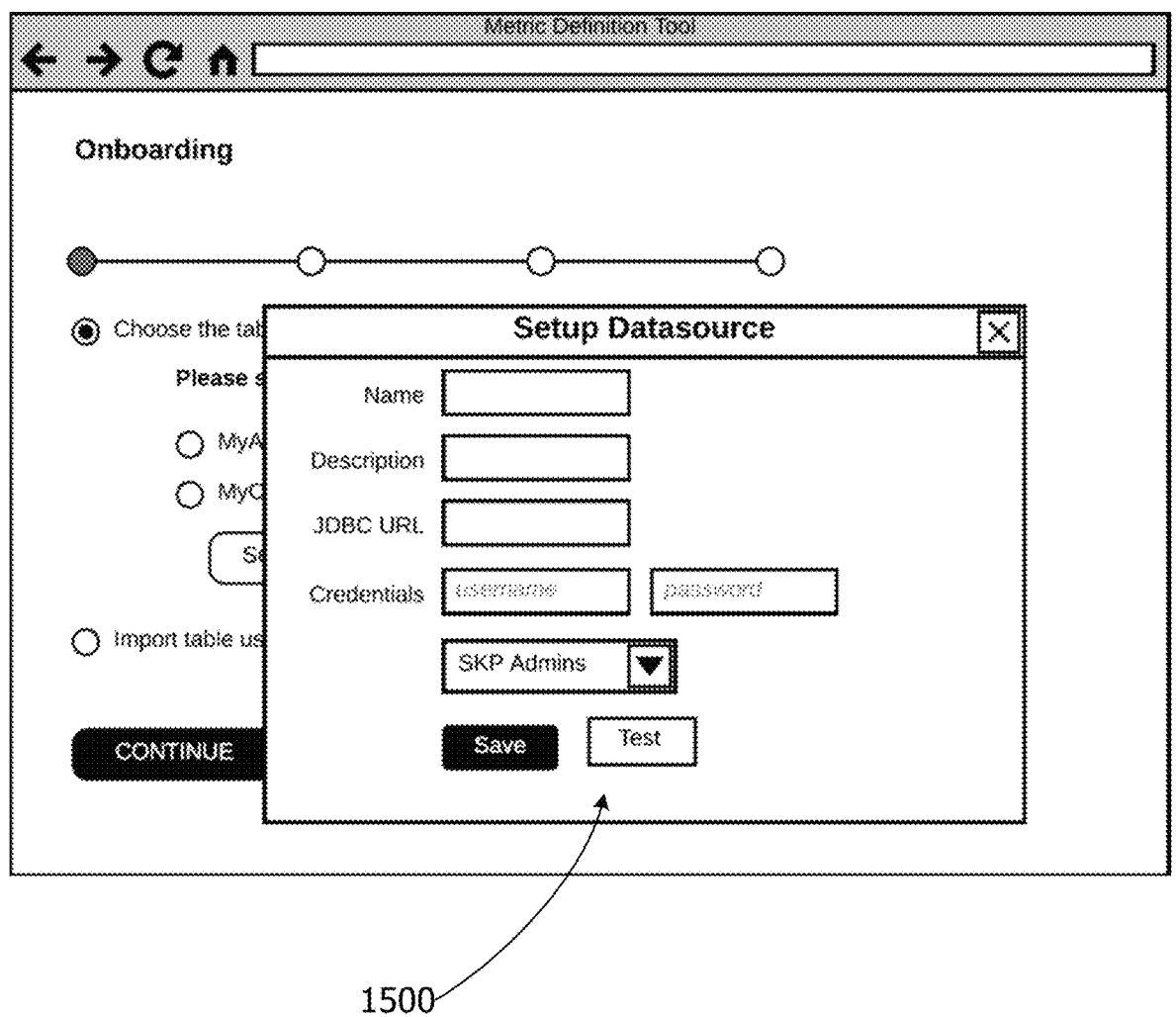
FIG. 15 is an exemplary screenshot illustrating a UI for setting up a data source for onboarding.

FIG. 15 is an exemplary screenshot 1500 illustrating a UI for setting up a data source for onboarding. The data source can be setup with a name, description, uniform resource locator (URL) locator or other information.

Figure 16:
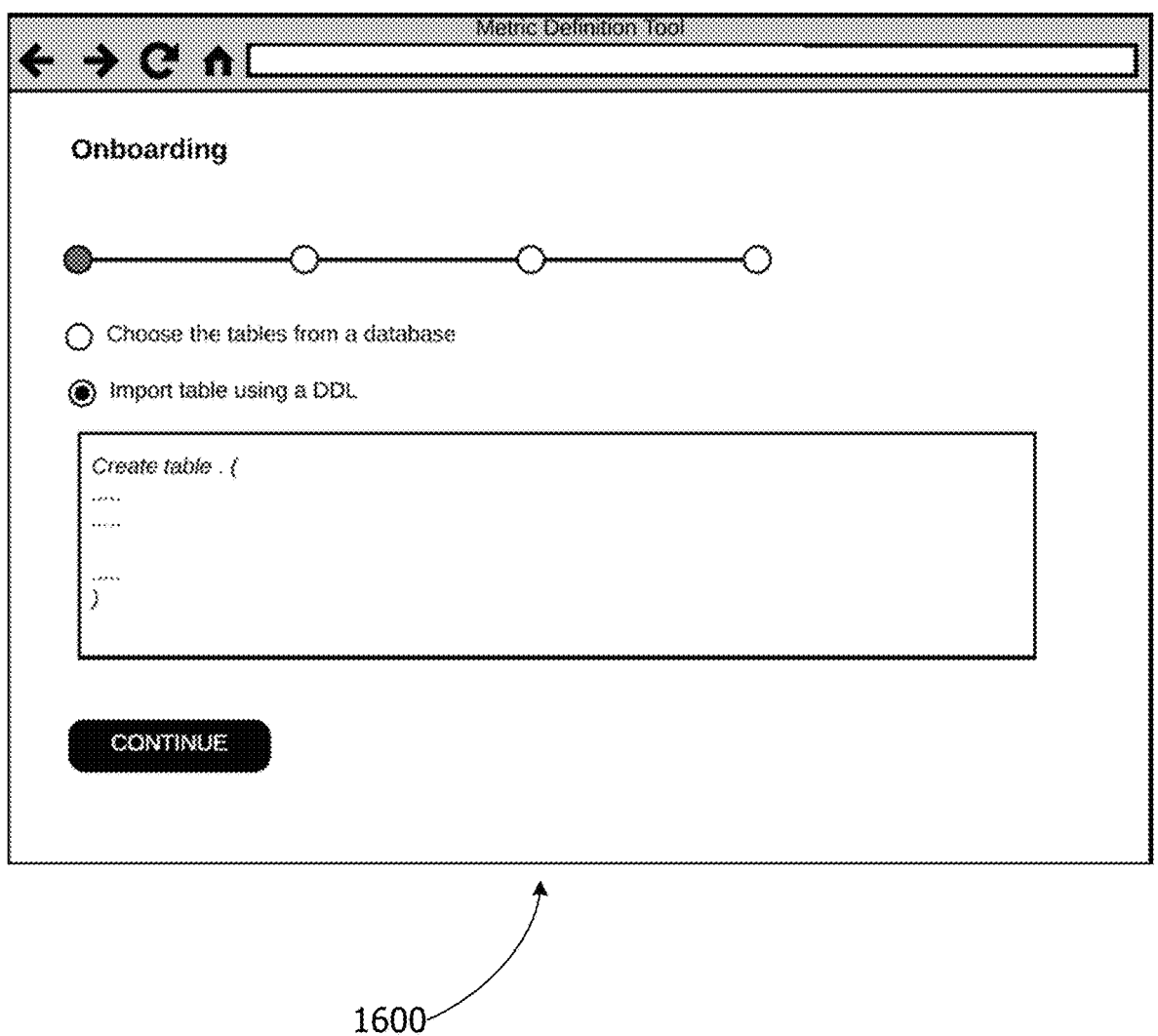
FIG. 16 is an exemplary screenshot illustrating a UI for importing a data table during onboarding.

FIG. 16 is an exemplary screenshot 1600 illustrating a UI for importing a data table during onboarding. A user utilizes the UI to import data tables using a DDL database credentials in this non-limiting example.

Figure 17:
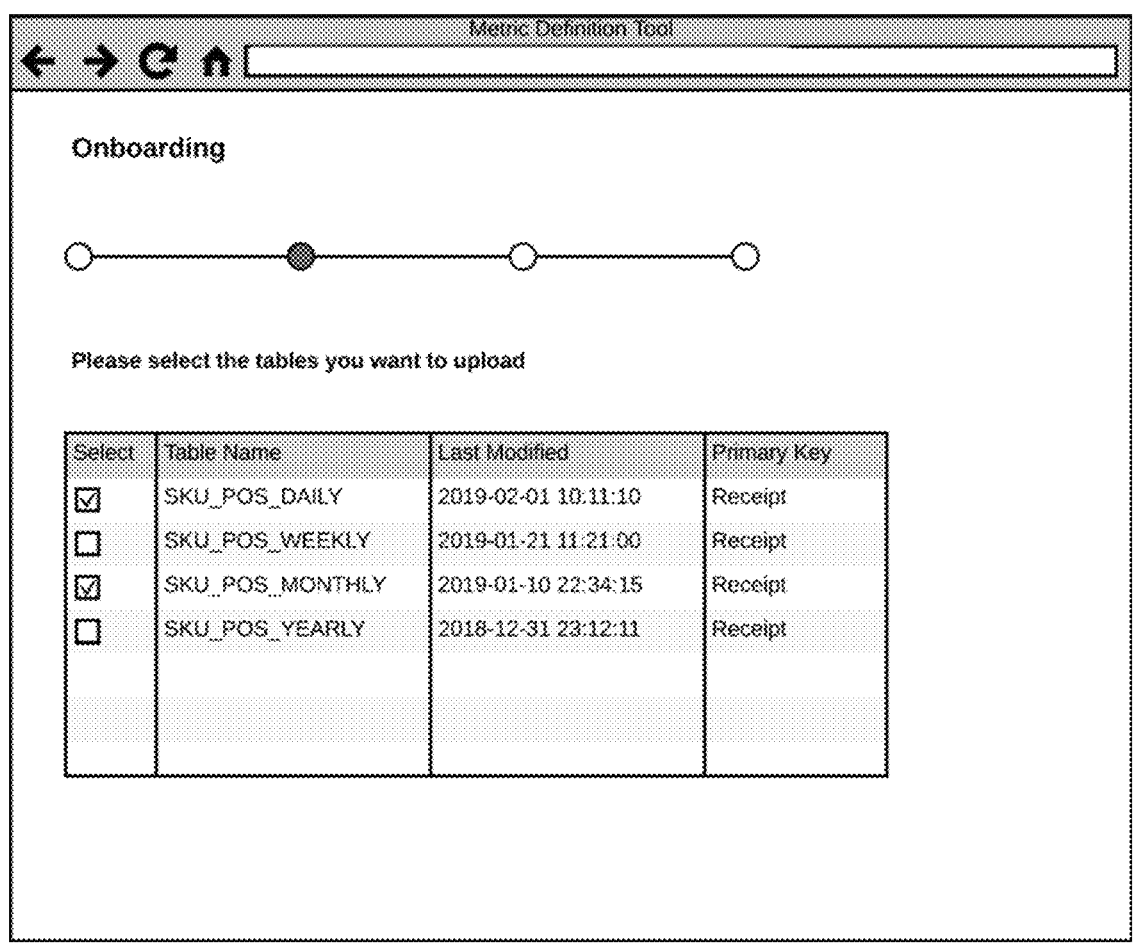
FIG. 17 is an exemplary screenshot illustrating a UI for onboarding data tables.

FIG. 17 is an exemplary screenshot 1700 illustrating a UI for onboarding data tables. The user can utilize the UI to select a table from a set of data tables for onboarding/uploading for analysis during KPI creation and/or creation of visualizations.

Figure 18:
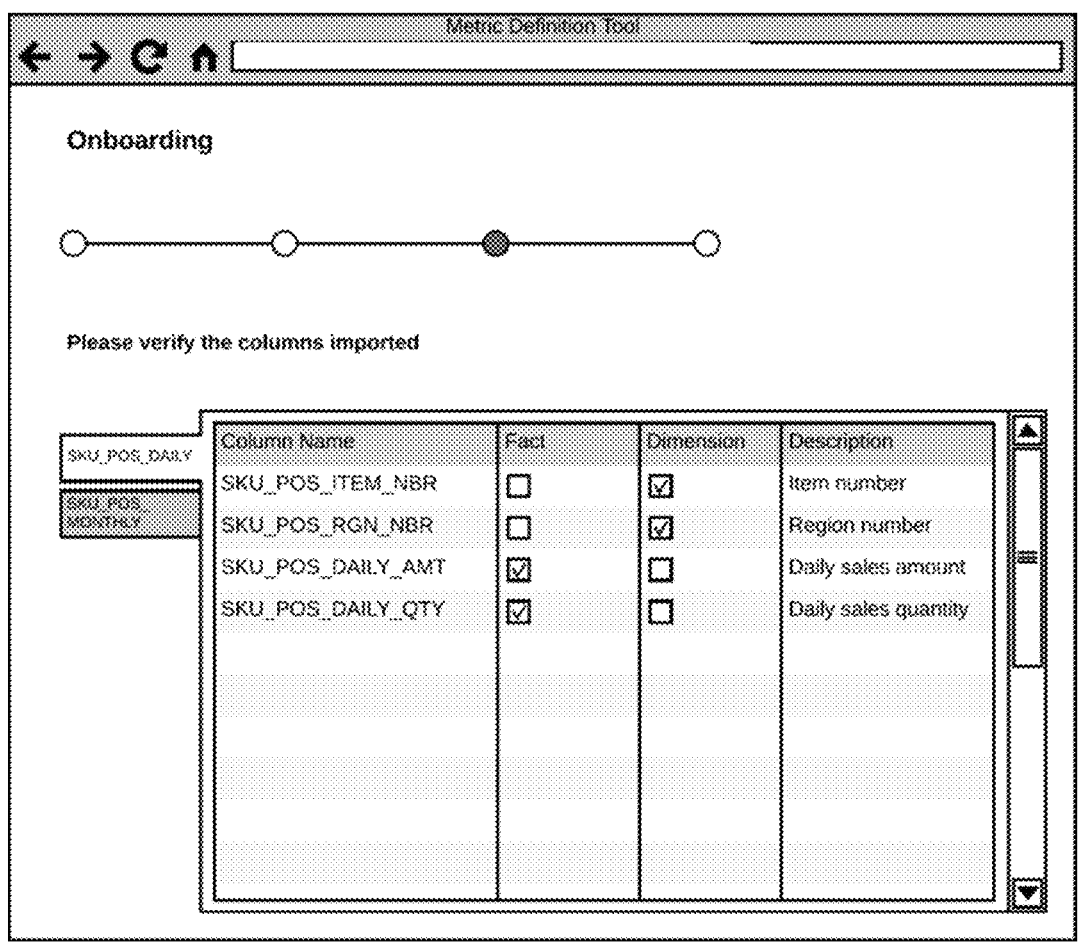
FIG. 18 is an exemplary screenshot illustrating a UI for verifying imported columns during onboarding.

FIG. 18 is an exemplary screenshot 1800 illustrating a UI for verifying imported columns during onboarding. The UI enables the user to verify the columns for import.

Figure 19:
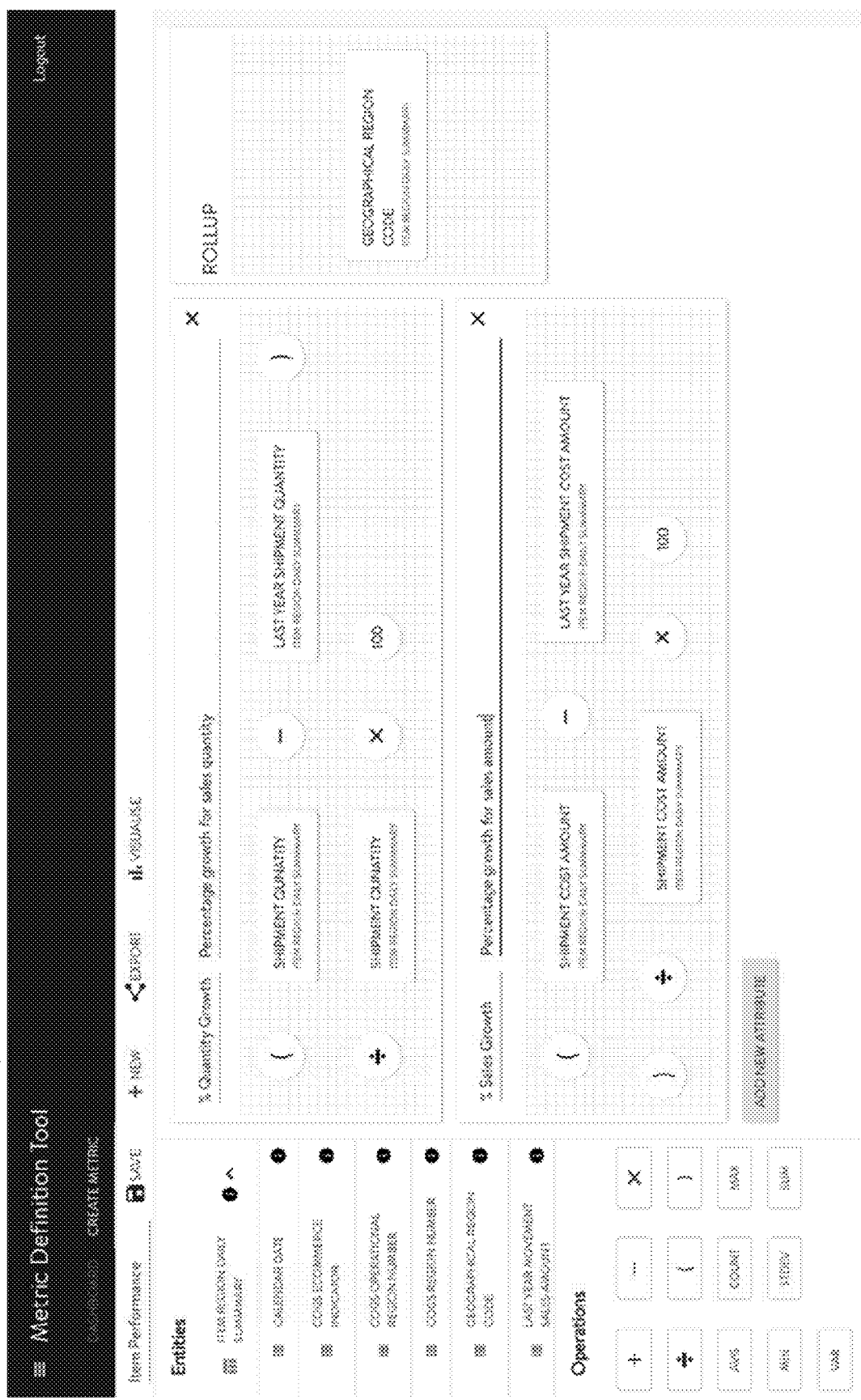
FIG. 19 is an exemplary screenshot illustrating a UI for creating a performance metric.

FIG. 19 is an exemplary screenshot 1900 illustrating a UI for creating a performance metric. The UI includes performance metrics such as, but not limited to, percentage quantity growth, percentage sales growth or any other type of performance metric.

Figure 20:
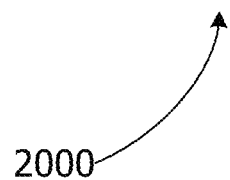
FIG. 20 is an exemplary screenshot illustrating a UI for exporting a KPI to a destination data source.

FIG. 20 is an exemplary screenshot 2000 illustrating a UI for exporting a KPI to a destination data source. The UI enables the user to export the created KPI to a user-selected destination data source.

Figure 21:
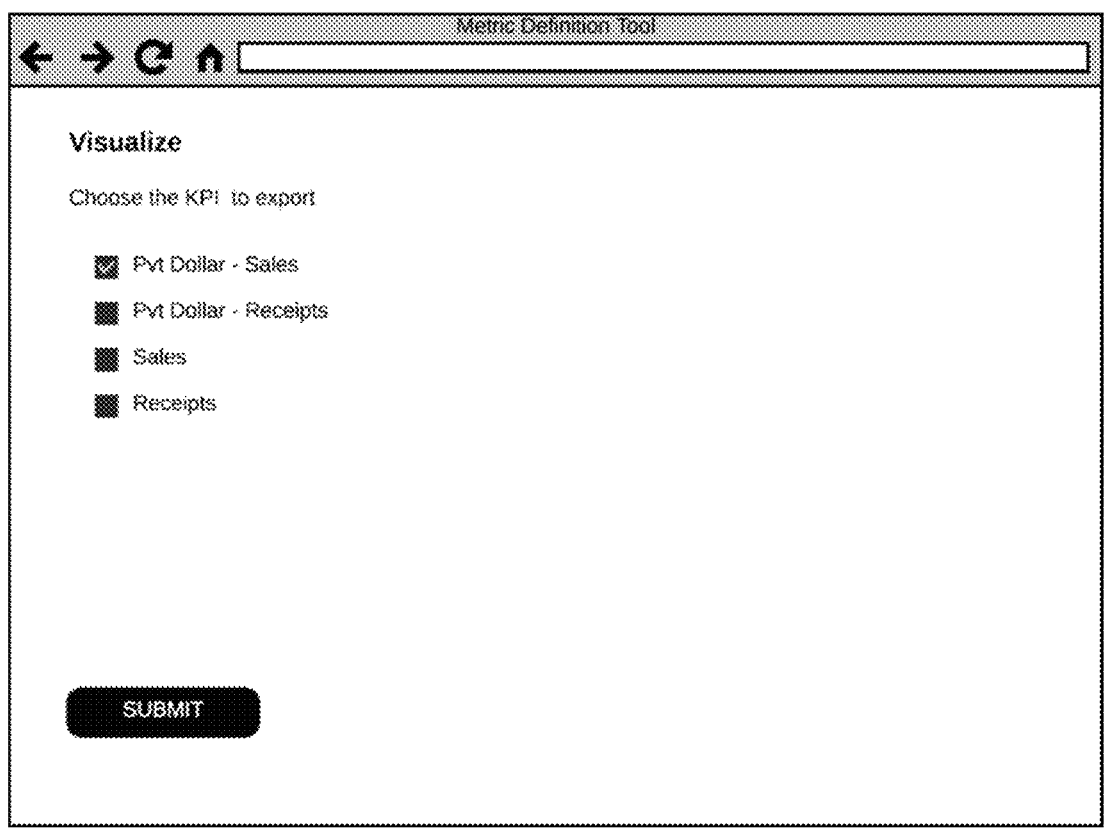
FIG. 21 is an exemplary screenshot illustrating a UI for visualization of a KPI.

FIG. 21 is an exemplary screenshot 2100 illustrating a UI for visualization of a KPI. The UI enables the user to select KPIs for visualization in this non-limiting example.

FIG. 22 is an exemplary screenshot 2200 illustrating a KPI visualization. The screenshot in this example includes a bar graph representing a sales-performance KPI.

Additional Examples

In some examples, the metric definition tool provides a web-based solution that automatically searches existing KPIs and performs semantic analysis of table metadata to identify business performance metrics of interest to a user. The system generates a visualization of the KPIs, such as, but not limited to, graphs, tables, charts and other metric visualizations. In some examples, the metric definition tool outputs a recommendation to generate possible rollup columns for business KPIs from multiple tables and data sources.

The system provides a user interface that is both intuitive and user friendly, such as by providing a drag and drop user interface KPI builder to build and perform ad-hoc KPI to facilitate business analytics. The system performs mathematical operations and aggregations as part of building and executive KPI. The metric definition component builds upon pre-existing KPIs and join them in meaningful ways to create new business KPIs.

The metric definition system in other examples is domain agnostic and can be used for various domains based on data model. Non-technical users can use the system to create business level KPIs.

In an illustrative example, the system performs data onboarding process where applications are onboarded. The onboarding component permits user/business or nontechnical to connect the system to one or more sources of data, such as connecting to a database, to obtain metric-related data (information). The system defines KPIs and provides visualization of defined performance metrics without developer team intervention. The user (business) does not have to interact with development team for KPI creation or visualization. Once KPI is created, the business does not have to go to development team for visualization. This reduces KPI development time from 10 days to 2 days when data is readily available. The metric definition component can reduce KPI development time from 20 days to only 7 days without technical knowledge in other examples.

In other examples, the user chooses data sources where data is pulled/extracted. Onboarding data sources is one-time. If tables are already present, the onboarding step is unnecessary.

In an exemplary scenario, a user provides database credentials to permit the metric definition application to connect to a database (data source). The metric definition component searches for tables and onboards the data tables. The metric definition component classifies the tables as fact or dimension. The metric definition component identifies the dimensions columns, fact columns and tags. The metric definition component establishes the related metrics. The metric definition component derives/creates a hierarch for the dimensions.

In another example, the metric definition component performs metrics search/discover. The user searches the A0/A1/A2 . . . attributes based on tags or free text to create derived attributes (built on). The user chooses the attributes. The system chooses group-by/dicing attributes (dimensions classify for rollup and group-by). The system choose the filter/slicing (where clause) and create the expression. The system adds ability to create similar expressions with varying filters but same group by attributes. The system adds metadata for new expression and persist the derived attribute. The system performs execution of derived attributes. The user can choose the derived attribute and export/compute the sample data. The system exports the sample data into excel and persist the sample data into a database. The system creates a visualization of the sample data using portal. The system imports data from data console and adds the ability to go to data console UI.

Alternatively, or in addition to the other examples described herein, examples include any combination of the following:

a set of tables within a database associated with at least one data source in the set of data sources, wherein the onboarding component imports the set of tables via the database credentials;

an analysis component, implemented on the at least one processor, performs semantic analysis on table metadata associated with a set of data tables available via the connected set of data sources, wherein the extracted table metadata identifies at least one of table name, index keys or columns;

an analysis component, implemented on at least one processor, automatically identifies facts and dimensions within at least one data structure extracted from at least one data source in the set of data sources;

an upload component, implemented on at least one processor, uploads data during visualization if a selected data structure is uploaded without a connection to a data source associated with the selected data structure;

an upload component, implemented on at least one processor, uploads data structure during onboarding;

a graphical user interface implemented on the at least one processor that provides a drag-and-drop option enabling a user to drag-and-drop visual component required for visualizing a selected KPI;

a graphical user interface implemented on the at least one processor that provides a drag-and-drop option enabling a user to drag-and-drop entities and attributes required for visualizing the formula for a selected KPI;

a graphical user interface implemented on the at least one processor that provides an interface to visualize multiple formulas for creating a selected KPI;

the metric definition component automatically identifies rollup columns associated with at least one data table required for at least one structured query language (SQL) query associated with identifying at least one KPI;

a dynamic set of data sources including at least one list of tables, dimensions or fact tables, wherein the dynamic set of data sources are uploaded to a data storage device for analysis during creation of the set of KPIs;

a portal page, implemented on the user interface device, wherein the portal page provides a set of GUI options for self-service creation of KPIs via the metric definition component;

connecting, by an onboarding component, to the set of data sources using the connection data provided by a user via a user interface device, the set of data sources comprising a cloud storage, wherein a connection with the cloud storage is accomplished via a network;

importing, by an onboarding component, a set of tables within a database associated with at least one data source in the set of data sources, wherein the onboarding;

uploading, by an upload component, performance data associated with at least one KPI for utilization during visualization on condition a selected data structure is uploaded without a connection to a data source associated with the selected data structure;

performing semantic analysis on table metadata associated with a set of data tables available via the connected set of data sources, wherein the extracted table metadata identifies at least one of table structure, table name, index keys or columns;

automatically identifying at least one rollup column associated with at least one data table required for at least one structured query language (SQL) query associated with identifying at least one KPI;

uploading a dynamic set of data sources including at least one list of tables, dimensions or fact tables, wherein the dynamic set of data sources are uploaded to a data storage device (database) for analysis during creation of the set of KPIs;

creating a set of visualizations representing data associated with the at least one KPI, wherein the set of visualizations provide a graphical representation of a quantifiable measurement gauging performance based on the at least one KPI in the set of KPIs;

connecting to at least one data source via a network using connection data provided by a user via a user interface device, the set of data sources comprising a cloud storage, wherein a connection with the cloud storage is accomplished via a network;

providing a KPI creation and visualization portal page via a GUI associated with an output device, wherein the portal page provides a set of GUI options for self-service creation of KPIs via the metric definition component and self-service visualization of KPIs;

wherein entity classification further comprises onboarding related entities; classifying entities as fact or dimension; updating classification with updates from a user on condition user-provided updates are provided; persisting information from the updated classification into a set of relationship graphs;

wherein entity search further comprises searching for related entities and attributes using a set of user-provided key words; identifying entities related to the set of user-provided key words from a relationship graph; adding the entities and attributes to a result set;

wherein entity relationship mapping further comprises identifying a set of entities associated with a set of user-provided attributes; obtaining a set of entity pairs from an entities list; creating a join clause using a set of primary keys for each pair from the entities list; and creating a query using input provided by at least one user and the created join clause; and executing a set of algorithms to generate a KPI by the metric definition component, wherein the set of algorithms further comprises an entity classification algorithm, an entity search algorithm and an entity relational mapping algorithms.

At least a portion of the functionality of the various elements in FIG. 1, FIG. 2, FIG. 3, FIG. 4 and FIG. 5 can be performed by other elements in FIG. 1, FIG. 2, FIG. 3, FIG. 4 and FIG. 5, or an entity (e.g., processor 106, web service, server, application program, computing device, etc.) not shown in FIG. 1, FIG. 2, FIG. 3, FIG. 4 and FIG. 5.

In some examples, the operations illustrated in FIG. 6, FIG. 7, FIG. 8, FIG. 9, FIG. 10, FIG. 11 and FIG. 12 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of KPI creation and visualization, the method comprising extracting a set of data structures associated with a set of data sources; analyzing the extracted set of data structures and a set of predefined performance metrics; defining a set of KPIs based on the analysis of the extracted data; and generating at last one visualization representing data associated with the at least one KPI in the set of KPIs for display to a user via an output device.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for metric definition and visualization. For example, the elements illustrated in FIG. 1, FIG. 2, FIG. 3, FIG. 4 and FIG. 5, such as when encoded to perform the operations illustrated in FIG. 6, FIG. 7, FIG. 8, FIG. 9, FIG. 10, FIG. 11 and FIG. 12, constitute exemplary means for extracting a set of data structures associated with a set of data sources; exemplary means for analyzing the extracted set of data structures and a set of predefined performance metrics; exemplary means for defining a set of KPIs based on the analysis of the extracted data; and exemplary means for generating at last one visualization representing data associated with the at least one KPI in the set of KPIs for display to a user via an output device.

Other non-limiting examples provide one or more computer storage devices having a first computer-executable instructions stored thereon for providing automatic definition and visualization of business performance metrics. When executed by a computer, the computer performs operations including uploading a dynamic set of data sources including at least one of a list of tables, dimensions, or fact tables, wherein the dynamic set of data sources are uploaded to a database for analysis during creation of the set of KPIs; extracting a set of data structures associated with the uploaded set of data sources; analyzing the extracted set of data structures and a set of predefined performance metrics; defining a set of KPIs based on the analysis of the extracted data; and exporting the set of KPIs and data associated with the set of KPIs to at least one destination database.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for defining and visualizing key performance metrics, the system comprising:
a memory;
at least one processor communicatively coupled to the memory;
a set of data sources associated with at least one data storage device;
a user interface device for receiving database credentials associated with connecting to the set of data sources;
an onboarding component, implemented on the at least one processor, connecting to the set of data sources using connection data via a network, the connection data comprising the database credentials;
an extraction component, implemented on the at least one processor, extracts data and corresponding data structure of data assets associated with the set of data sources and a set of predefined business performance metrics;
a key performance indicator (KPI) creation component, implemented on the at least one processor, automatically defines at least one KPI based on analysis of the extracted data and a set of user-provided attribute operators for KPI creation, wherein the user-provided attribute operators are identified by a user-provided key word;
a graphical user interface implemented on the at least one processor configured to enable a user to access a portal page implemented on the user interface device, wherein the portal page is accessed via a web browser and provides a set of GUI options for self-service creation, by the user, of KPIs via a metric definition component;
the metric definition component, implemented on the at least one processor:
validates the created KPI by the user using a subset of the extracted data,
identifies one or more entities related to the user-provided key word from a relationship graph;
obtains a set of entity pairs from an entities list, the entities list including the one or more entities, wherein each entity pair including a primary key (PK); and
creates a query using user input provided by the user and a join clause created using the PK for the each entity pair from the entities list;
an export component, implemented on the at least one processor, exports at least one KPI to a destination data source;
a visualization component, implemented on the at least one processor, creates a set of visualizations representing data associated with the at least one KPI; and
an output device outputs at least one visualization in the set of visualizations to at least one user, wherein the at least one visualization provides a graphical representation of a quantifiable measurement gauging performance based on the at least one KPI.

2. The system of claim 1, further comprising:
a set of tables within a database associated with at least one data source in the set of data sources, wherein the onboarding component imports the set of tables via the database credentials.

3. The system of claim 1, further comprising:
an analysis component, implemented on the at least one processor, performs semantic analysis on table metadata associated with a set of data tables available via the set of data sources, wherein:
the table metadata identifies at least one of table name, index keys or columns;
the analysis component automatically identifies facts and dimensions within at least one data structure extracted from at least one data source in the set of data sources, and
wherein:
the metric definition component identifies the PK for each set of entity pairs,
the metric definition component compares the PK with the identified dimensions to identify an upgrade to the system,
the metric definition component creates the join clause using the PK for the each entity pair.

4. The system of claim 1, further comprising:
an upload component, implemented on the at least one processor, uploads data structure during onboarding.

5. The system of claim 1, wherein:
the graphical user interface provides a drag-and-drop feature enabling the user to drag-and-drop entities and attributes required for visualizing a selected KPI.

6. The system of claim 1, further comprising:
a graphical user interface implemented on the at least one processor that provides an interface to visualize multiple formulas for creating a selected KPI and provides charts to a display of the user interface device for visualization of the selected KPI.

7. The system of claim 1, wherein the metric definition component automatically identifies rollup columns associated with at least one data table required for at least one structured query language (SQL) query associated with identifying the at least one KPI.

8. The system of claim 1, further comprising:
the set of data sources including at least one list of tables, dimensions or fact tables, wherein the set of data sources are uploaded to a database for analysis during creation of a set of KPIs.

9. The system of claim 1, wherein the graphical user interface further enables the user to drag-and-drop, via the portal page, the user-provided attribute operators for the self-service creation of the at least one KPI.

10. A computer-implemented method for defining and visualizing key performance metrics, the method comprising:
extracting, by an extraction component, a set of data structures associated with a set of data sources;
analyzing, by an analysis component, an extracted set of data structures and a set of predefined performance metrics;
defining, by a metric definition component, a set of KPIs based on the analysis of the extracted set of data structures and a set of user-provided attribute operators for KPI creation, wherein the user-provided attribute operators are identified by a user-provided key word;
self-service creating, via a portal page accessed via a graphical user interface and implemented on a user interface device, the set of KPIs, wherein the graphical user interface provides a set of GUI options for self-service creation, by a user, of KPIs via the metric definition component;
validating, by the metric definition component, the created set of KPIs by the user using a subset of the extracted set of data structures;
identifying one or more entities related to the user-provided key word from a relationship graph;

obtaining a set of entity pairs from an entities list, the entities list including the one or more entities, wherein each entity pair including a primary key (PK);

creating a query using user input provided by the user and a join clause created using the PK for the each entity pair from the entities list; and generating, by a visualization component, at last one visualization representing data associated with at least one KPI in the set of KPIs for display to the user via an output device.

11. The computer-implemented method of claim 10, further comprising:

connecting, by an onboarding component, to the set of data sources using connection data provided by the user via a user interface device, the set of data sources comprising a cloud storage, wherein a connection with the cloud storage is accomplished via a network; and importing, by an onboarding component, a set of tables within a database associated with at least one data source in the set of data sources, wherein the onboarding component imports the set of tables via database credentials.

12. The computer-implemented method of claim 10, further comprising:

onboarding related entities;

classifying entities as fact or dimension;

updating classification with updates on condition user-provided updates are provided by the user; and persisting information from the updated classification into a set of relationship graphs.

13. The computer-implemented method of claim 10, further comprising:

searching for related entities and attributes using a set of the user-provided key words; and adding the entities and attributes to a result set.

14. The computer-implemented method of claim 10, further comprising:

identifying entities of the one or more entities associated with a set of the user-provided attributes;

obtaining the set of entity pairs from the entities list; and creating the join clause using the PK for the each entity pair.

15. The computer-implemented method of claim 10, further comprising:

automatically identifying at least one rollup column associated with at least one data table required for at least one structured query language (SQL) query associated with identifying the at least one KPI.

16. The computer-implemented method of claim 10, further comprising:

uploading the set of data sources including at least one of a list of tables, dimensions, or fact tables, wherein the set of data sources are uploaded to a database for analysis during creation of the set of KPIs.

17. One or more non-transitory computer storage devices, having computer-executable instructions for defining and visualizing key performance metrics by a metric definition component, that, when executed by a computer cause the computer to perform operations comprising:

uploading a dynamic set of data sources including at least one of a list of tables, dimensions, or fact tables, wherein the dynamic set of data sources are uploaded to a database for analysis during creation of a set of KPIs;

self-service creating, via a portal page accessed via a graphical user interface and implemented on a user interface device, the set of KPIs, wherein the graphical user interface provides a set of GUI options for self-service creation, by a user, of KPIs via the metric definition component;

extracting a set of data structures associated with the dynamic set of data sources;

analyzing an extracted set of data structures and a set of predefined performance metrics;

defining the created set of KPIs by the user based on the analysis of data associated with the extracted set of data structures and a set of user-provided attribute operators for KPI creation, wherein the user-provided attribute operators are identified by a user-provided key word;

validating, by the metric definition component, the created set of KPIs by the user using a subset of the extracted set of data structures;

identifying one or more entities related to the user-provided key word from a relationship graph;

obtaining a set of entity pairs from an entities list, the entities list including the one or more entities, wherein each entity pair including a primary key (PK);

creating a query using user input provided by the user and a join clause created using the PK for the each entity pair from the entities list; and exporting the set of KPIs and data associated with the created set of KPIs by the user to at least one destination database.

18. The one or more non-transitory computer storage devices of claim 17, wherein the metric definition component, when further executed by a computer, cause the computer to perform operations comprising:

creating a set of visualizations representing data associated with at least one KPI, wherein the set of visualizations provide a graphical representation of a quantifiable measurement gauging performance based on the at least one KPI in the set of KPIs.

19. The one or more non-transitory computer storage devices of claim 17, wherein the metric definition component, when further executed by a computer, cause the computer to perform operations comprising:

connecting to at least one data source via a network using connection data provided by a user via a user interface device, the dynamic set of data sources comprising a cloud storage, wherein a connection with the cloud storage is accomplished via a network.

20. The one or more non-transitory computer storage devices of claim 17, wherein the metric definition component, when further executed by a computer, cause the computer to perform operations comprising:

executing a set of algorithms to generate a KPI, wherein the set of algorithms further comprises an entity classification algorithm, an entity search algorithm and an entity relational mapping algorithms.

* * * * *